US005596691A

United States Patent [19]
Good et al.

[11] Patent Number: 5,596,691
[45] Date of Patent: Jan. 21, 1997

[54] COMPUTER SYSTEM AND METHOD FOR MANIPULATING THE DISPLAY OF DRAWINGS

[75] Inventors: Charles F. Good, Milford, Ohio; Craig S. Young, Zephyr Cove, Nev.; Antonio M. Fernandes, Monte Sereno, Calif.

[73] Assignee: Claris Corporation, Santa Clara, Calif.

[21] Appl. No.: 647,644

[22] Filed: May 15, 1996

Related U.S. Application Data

[63] Continuation of Ser. No. 260,014, Jun. 15, 1994, abandoned.

[51] Int. Cl.$^6$ ........................................... G06F 15/00
[52] U.S. Cl. ............................................. 395/140
[58] Field of Search ................... 395/133, 140; 345/115, 117, 118

[56] References Cited

U.S. PATENT DOCUMENTS

| | | | |
|---|---|---|---|
| 4,829,446 | 5/1989 | Draney | 364/488 |
| 5,317,680 | 5/1994 | Ditter, Jr. | 395/135 |

Primary Examiner—Phu K. Nguyen
Attorney, Agent, or Firm—Greg T. Sueoka; Christopher M. Tobin

[57] ABSTRACT

A system for changing the display characteristics of a drawing has one model style, a top graphics table memory for storing a top graphics table, a chart table memory for storing a chart table, a default box graphics table memory for storing a default box graphics table, and a level table memory for storing level tables, display routines for displaying the drawing on a display device, and model routines for changing the model style of a drawing. The model routines, when changing the model style, retrieve a model style from a model style library. The model routines re-configure the chart table, the default box graphics table, and the level tables according to the retrieved model style. The system includes a set of filters that control the application of a model style. As the model routines re-configure the chart table, the default box graphics table, and the level tables, the model routines analyze the filters. The model routines do not modify certain selected visual characteristics of a drawing if the filters are set. Finally, the model routines and display routines re-configure the top graphics table for the display of the drawing.

13 Claims, 20 Drawing Sheets

| NUMBER OF BOXES IN LEVEL | BOX INDEX<br>CONNECTOR INDEX<br>ASSISTANT FLAG<br>PARENT<br>CHILD START<br>CHILD STOP<br>ASSISTANT START<br>ASSISTANT STOP<br>WORKER LAYOUT<br>ASSISTANT LAYOUT<br>HIDDEN DATA<br>DEFAULT FLAG | BOX INDEX<br>CONNECTOR INDEX<br>ASSISTANT FLAG<br>PARENT<br>CHILD START<br>CHILD STOP<br>ASSISTANT START<br>ASSISTANT STOP<br>WORKER LAYOUT<br>ASSISTANT LAYOUT<br>HIDDEN DATA<br>DEFAULT FLAG | ⋯ | BOX INDEX<br>CONNECTOR INDEX<br>ASSISTANT FLAG<br>PARENT<br>CHILD START<br>CHILD STOP<br>ASSISTANT START<br>ASSISTANT STOP<br>WORKER LAYOUT<br>ASSISTANT LAYOUT<br>HIDDEN DATA<br>DEFAULT FLAG |
|---|---|---|---|---|
| | 94-1 | 94-2 | | 94-n |

FIG. 8

COMPUTER SYSTEM AND METHOD FOR MANIPULATING THE DISPLAY OF DRAWINGS

RELATED APPLICATIONS

This is a continuation of prior application Ser. No. 08/260,014 filed on Jun. 15, 1994, now abandoned.

BACKGROUND OF THE INVENTION

1. Field of the Invention

The present invention relates generally to systems for creating, modifying, and manipulating charts and diagrams using computers. In particular, the present invention relates to a system and methods for manipulating and modifying the display of charts and diagrams. The present invention also relates to systems and methods for modifying the display of charts and diagrams.

2. Description of the Related Art

The use of personal computers has become widespread for a variety of functions and applications in business and education. One such application of computers is their use for producing, printing, and displaying graphical images. Still more particularly, a variety of application programs have been developed for creating flowcharts, organizational charts, and various other diagrams. Such existing systems provide for the creation of various drawing elements and their interconnection. For example, there are a variety of very complex computer aided design or drafting programs for creating any type of mechanical, electrical, and architectural drawings. There are also more simplistic drawing programs for creating only flowcharts or only organizational charts. Many of these programs include settings for how each element of a flowchart or diagram is displayed. A setting is a pre-defined set of characteristics for the element of the flowchart or diagram. The setting defines how the element will be displayed. The settings include text, the shape of elements, the thickness of lines, and other characteristics. The settings are on an elemental level; they do not apply to the drawing as a whole.

One major problem with the existing flowcharting and drawing programs is that they are very difficult to use. The complex computer aided design programs usually require a significant amount of training to be used and are typically only used by skilled draftspersons. Even the more simplistic drawing programs with reduced functionality are cumbersome and difficult to use. For example, existing systems require a number of key strokes or inputs from a mouse type controller to change a setting used in a diagram. A means to modify the setting must first be activated. The element is then selected and a new setting indicated. The system then must change the setting and display the element in the new setting form. To change more than one characteristic of an element, each setting of the element must be individually changed. It is a cumbersome and time consuming process to change a setting of each element of an entire flowchart or diagram. Thus, there is a need for a system to change the characteristics of elements of a drawing on a drawing level so that characteristics of all elements may be changed quickly, efficiently, and consistently.

A number of drawing programs allow all elements of a flowchart or diagram to be selected and modified simultaneously. These systems, however, change the characteristics of each element in the same way; they do not allow for different treatment for the corresponding characteristics of different elements. For example, such a system can change the font of the text within all the elements of a flowchart. Such a system cannot, however, change the font of the text within diamond elements to a first font and the font of the text within rectangle elements to a second font. These systems can be used to select all similar elements, such as diamond elements, to modify the selected elements, and then to repeat the process for other groups of similar elements. As can be seen, this approach is repetitious and time consuming.

Therefore, there is a need for a system and methods providing for the simple and efficient application of visual characteristics to flowcharts and diagrams.

SUMMARY OF THE INVENTION

The present invention overcomes the limitations and shortcomings of the prior art with a system and methods for manipulating the display of drawings. The system of the present invention includes a central processing unit (CPU) that is coupled to a display device, an input device, a data storage device and a memory. The memory advantageously comprises: an operating system, charting and diagramming tools, drawing records, model routines, a chart table memory, display routines, a default box graphics memory, a level table memory, and filters. These memories are used by the CPU to change the visual characteristics of a drawing from one set of characteristics, called a model style, to another set of characteristics. The CPU under direction of routines in the memory modifies data objects, stored in the memory, that determine the display of elements. The CPU modifies these data objects according to a model style. The CPU uses the filters to determine if individual characteristics of the elements should be left unmodified. When an element is added to a drawing, the CPU also uses the routines in the memory to adjust, according to the selected model style, the display of the drawing. The CPU sets the characteristics of the new element and adjusts the characteristics of the already existing element to accommodate the new element. The system of the present invention for changing the model style in which elements are displayed is particularly advantageous because it is easy to use, it organizes the model style data separate from other data defining the elements. Thus, model style styles may be quickly and efficiently changed to display the drawing in various visually distinct manners.

The present invention also comprises methods for changing the model style in which a drawing is displayed. The preferred method of the present invention for changing the model style in which a drawing is displayed comprises the steps of: replacing the model style settings in a chart table; using the filters to determine which filters to replace; replacing objects in a top graphics table with default data; updating connectors in the top graphics table with default settings; and updating worker and assistant layouts. The preferred method for modifying a drawing in response to the insertion of a new element comprises the steps of: copying elements inferior to the inserted element into a lower level; applying the model style to the copied elements; deleting the copied elements from the prior level; and repeating the method for elements inferior to the copied elements.

BRIEF DESCRIPTION OF THE DRAWINGS

FIG. 8 is a block diagram of a level table for use with an organization chart;

DETAILED DESCRIPTION OF THE PREFERRED EMBODIMENTS

Figure 1:
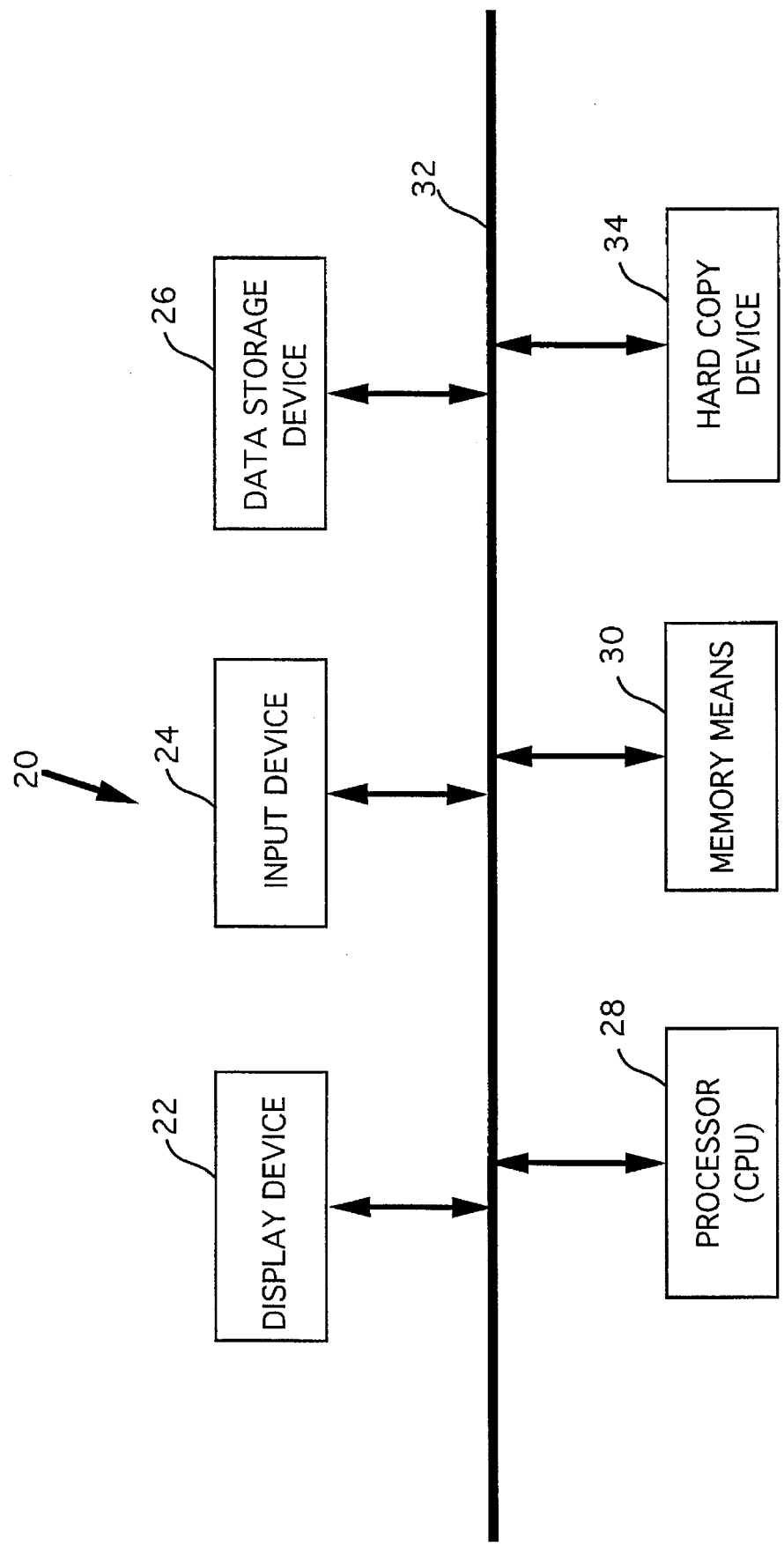
FIG. 1 is a block diagram of a preferred embodiment of the system of the present invention for manipulating the display of drawings.

Referring now to FIG. 1, a block diagram of a preferred embodiment of a graphics generation and manipulation system 20 constructed in accordance with the present invention is shown. The graphics generation and manipulation system 20 preferably comprises a display device 22, an input device 24, a data storage device 26, a central processing unit (CPU) 28, and a memory means 30. The central processing unit (CPU) 28, display device 22, input device 24, and memory means 30 are coupled in a von Neuman architecture via a bus 32 such as in a personal computer. The central processing unit 28 is preferably a microprocessor such as a Motorola 68040; the display device 22 is preferably a video monitor; and the input device 24 is preferably a keyboard and mouse type controller. The CPU 28 is also coupled to a hard copy device 34 such as a laser printer, in a conventional manner. In an exemplary embodiment, the system 20 is a Macintosh Quadra 800 computer. Those skilled in the art will realize that the system 20 could also be implement on an IBM personal computer.

The graphics generation and manipulation system 20 of the present invention displays a variety of images that are used to modify quickly and efficiently the characteristics of the elements of a drawing. The CPU 28, under the guidance of instructions received from the memory means 30 and from the user through the input device 24, provides signals for the display of data on the display device 22. The CPU 28 applies model styles to the drawing currently displayed on the display device 22. A model style is a set of visual characteristics that define how a drawing is displayed. A model style includes the size of the elements, the color of the elements, the size and position of labels, the thickness of lines, the font of text, the position of elements, the spacing between elements, and the frame around the drawing. In organization charts and flowcharts, a model style includes the type of connectors, either serial or parallel, the thickness of the connectors, and whether or not the connectors have arrows. There may be any number of visual characteristics included in a model style. Those skilled in the art will recognize the visual characteristics which may be included in a model style. For more details on specific characteristics, see Appendix A; attached hereto and incorporated herein by reference.

Figure 12:
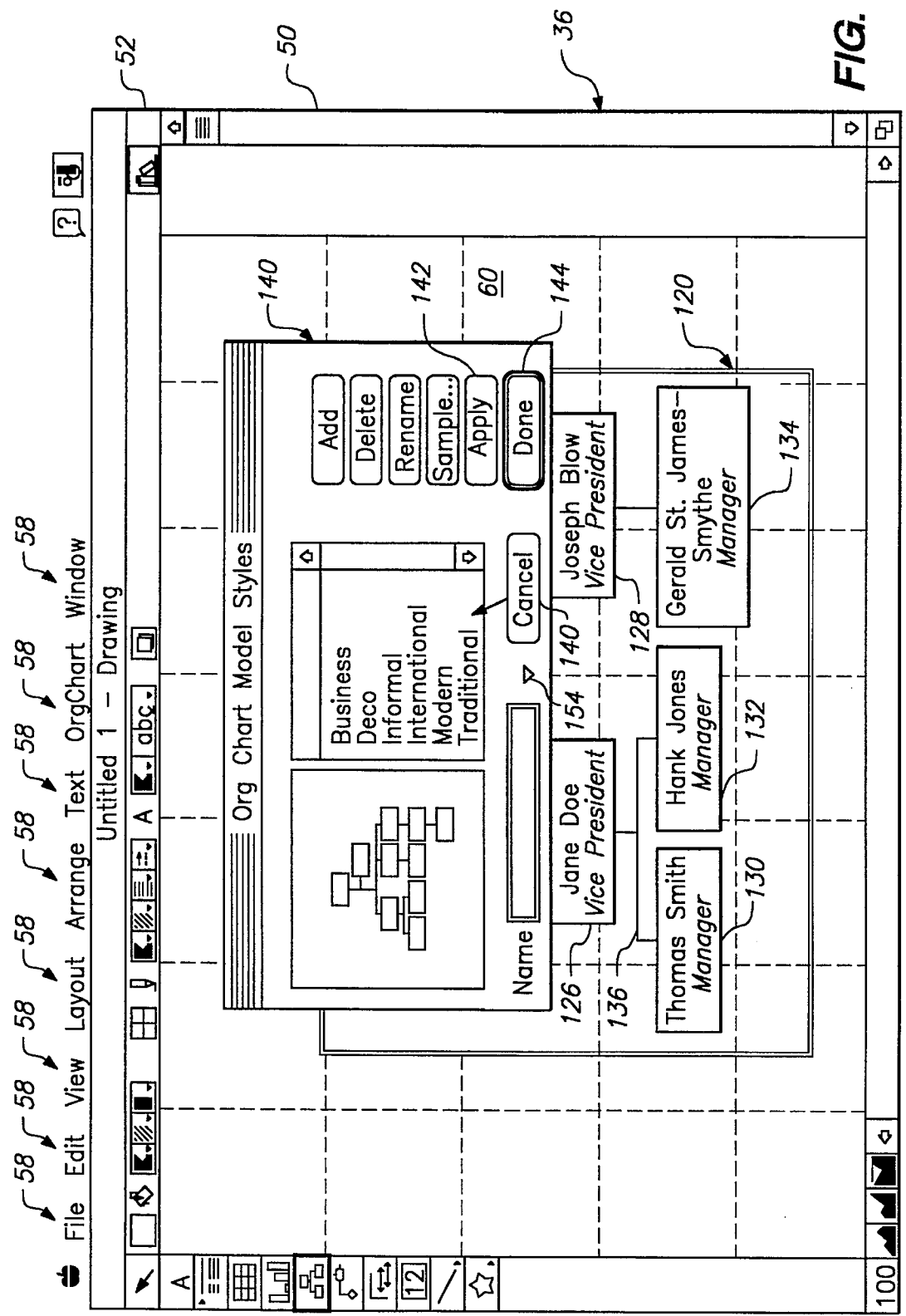
FIG. 12 is a graphical representation of the screen of the display device showing an interface for initiating a change in the model style in which a drawing is displayed.

In one aspect of the present invention, the system 20 presents on a screen 36 (shown in FIG. 9) of the display device 22 a means for automatically altering the characteristics of the elements of a drawing as shown for an exemplary organization chart 120 in FIG. 12. This means includes a model style modification user interface. In response to the selection of a model style, the system 20 applies a model style to the drawing. The system 20 traverses the data objects that describe the drawing. The system 20 then generates new data objects in the default form of the selected model style. The data objects are then modified to describe specifically the drawing. In this way, the system 20 changes the model style of a drawing while maintaining the underlying data of the drawing.

In another aspect of the present invention, the system 20 automatically selects and incorporates the correct characteristics for an inserted or added element of a drawing. The system 20 analyzes the elements that surround the new element and determines the correct characteristics for the model style, the element, and the elements position. The system 20 then records the current characteristics and displays the element with the correct characteristics.

Figure 2:
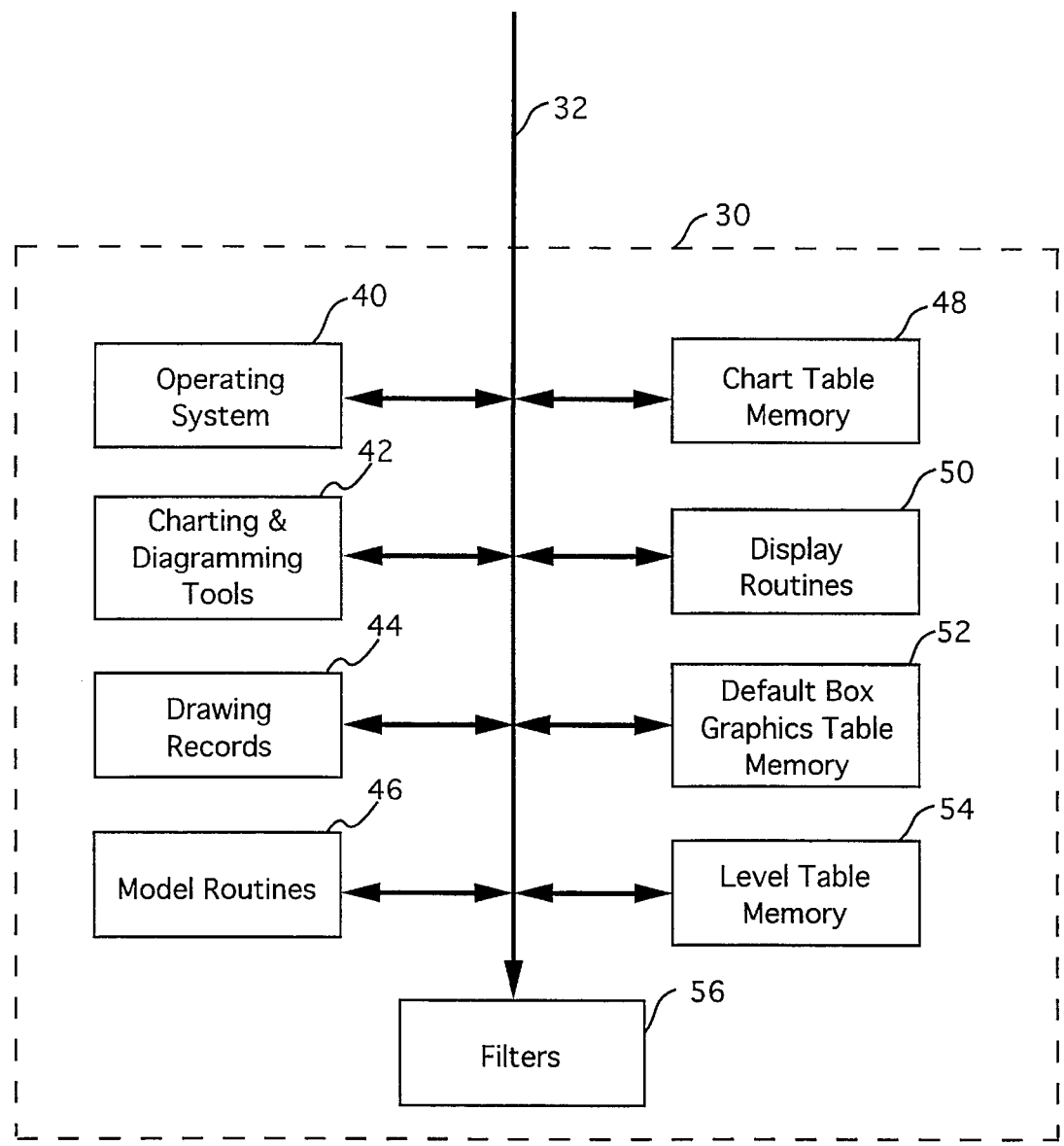
FIG. 2 is a block diagram of a preferred embodiment of the memory of the present invention for manipulating the display of drawings.

Referring now to FIG. 2, a preferred embodiment of the memory means 30 is shown. The memory means 30 is preferably constructed with random access memory (RAM) and read-only memory (ROM). The memory means 30 includes an operating system 40, charting and diagramming tools 42, drawing records 44, model routines 46, a chart table memory 48, display routines 50, a default box graphics table memory 52, a level table memory 54, and filters 56. The charting and diagramming tools 42 are used to create a conventional environment for creating charts and diagrams. The system 20 stores the data forming a drawing such as drawing elements in the drawing records 44. Those skilled in the art will realize that various equivalent combinations of memories and registers can achieve the same results when used in accordance with the present invention. For example, while the memory blocks 40, 42, 44, 46, 48, 50, 52, 54, and 56 are shown as separate, they can easily comprise different regions of a contiguous space in memory.

The operating system 40 is preferably a conventional personal computer operating system such as System 7.1 for the Macintosh by Apple Computer, Inc. Alternatively, the present invention could use a conventional operating system such as DOS and Windows sold by Microsoft Corporation. The operating system 40 provides for creation of operation windows or areas of the display and recognizes manipulation of a mouse type controller and keyboard. Those skilled in the art will realize that application programs and the present invention provide commands to the operating system, and thus, the CPU 28 to control operation of the system 20.

The charting and diagramming tools 42 are preferably a sub-system or application program for generating and editing charts and drawings. The charting and diagramming tools 42 are preferably a drawing application program that provides the ability to generate several different types of charts such as flowcharts, organizational charts, bar charts, pie charts, etc. In an exemplary embodiment, the charting and diagramming tools 42 are any one of the existing application programs for creating business graphics known to those skilled in the art. The charting and diagramming tools 42 control the CPU 28 to produce a window or working display area on the display device 22. The CPU under direction and control of the charting and diagramming tools 42 displays a plurality of pull down menus and tool palettes for performing operations and functions in response to user manipulation of the input device 24. The operations include the creation, display, resizing, and movement of drawing elements including symbols, lines, text, and other various chart elements. The functionality of an exemplary embodiment is disclosed in the ClarisImpact User's Guide published by Claris Corporation of Santa Clara, Calif. and which is incorporated herein by reference.

The present invention preferably stores the data defining a drawing in the drawing records 44. The drawing records 44 includes a top graphics table 66 (shown in FIG. 4A) and may include one or more group graphics tables 55 (shown in FIG. 4B). The top graphics table 66 together with any group graphics tables 55 include the type of the element, the position of the element, size of the element and also information about the format, style, and other characteristics to be used when displaying the element on the display device 22 or when printing the element on the hard copy device 34. A drawing is made up of elements, which are circles, rectangles, squares, and other shapes, and connectors. Connectors indicate the connections between elements and may be lines. In the preferred embodiment, the top graphics table 66 provides a header field and a plurality of fields for storing data about the elements of the drawing. Those skilled in the art will realize that other fields may be added to the top graphics table beyond those specifically enumerated above. The data fields of the top graphics table identify a group of characteristics of the element. In this case, the field contains a pointer to a group graphics table 55. A group graphics table 55 preferably comprises a header field which identifies the group graphics table 55 and a plurality of fields for storing data about the group. Those skilled in the art will realize that a field of the group graphics table 55 may itself contain a pointer to another group graphics table 55.

Still referring to FIG. 2, it can be seen that the memory means 30 includes model routines 46, a chart table memory 48, display routines 50, a default box graphics table memory 52, a level table memory 54, and filters 56. The model routines 46 are program instructions which are used to control the CPU 28 for modifying the display characteristics of the elements of a drawing to change the model style in which the drawings are displayed. The chart table memory 48 stores chart tables that group similar elements of a drawing. The chart tables will be discussed in more detail below with reference to FIGS. 5 and 6. The display routines 50 are used with the drawing records 44 to present the data to the user on the display device 22 and through the hard copy device 34. The display routines 50 include a means for recording, in a temporary memory of the memory means 30, the actions that they take. The default box graphics table memory 52 holds default display information for the elements of a drawing. A default box graphics table is used for organization charts and calendars. The default box graphics table will be described in detail below with reference to FIG. 7.

The level table memory 54 stores at least one level table. A level table is a data structure that describes the elements of one level of an organization chart. The present invention preferably describes elements at the same level of an organization chart together in a level table. The level table memory 54 includes a level table for each level in the organization chart.

The filters 56 comprise program instructions which when executed by the CPU 28 modify the operation of the model routines 46. The model routines 46, when executed without the filters 56, will completely replace the current model style with the next model style. With the filters 56, the user can select certain characteristics of the current model style for inclusion in the new model style. The filters 56 instruct the model routines 46 to preserve these characteristics and not to replace these selected characteristics with the corresponding characteristics of the next model style. Thus, a new model style is actually created; the new model style is the combination of the preserved characteristics of the old model style and the remaining characteristics of the next model style.

Figure 3:
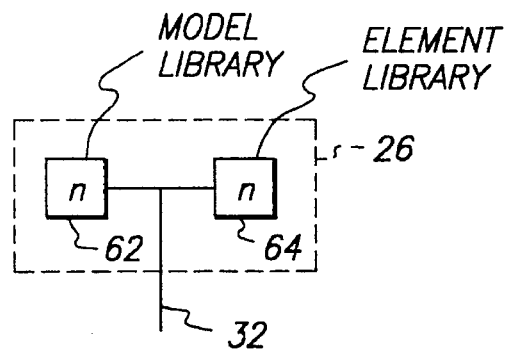
FIG. 3 is a block diagram of the data storage device of the present invention.

Referring now to FIG. 3, a block diagram of the data storage device 26 is shown. The data storage device 26 comprises a model style library 62 and an elements library 64. The model style library 62 contains complete descriptions of each model style that the system 20 has available. The model style library 62 contains at least one pre-recorded model style. The model style library 62 may store additional pre-recorded model styles and may additionally store model styles created by the user. When the model routines 46 change the model style of the currently active drawing, the model routines 46 retrieve the new model style from the model style library 62.

The element library 64 stores a plurality of elements from the model styles. While creating a drawing, the user may replace individual elements in the current model style with elements in a different model style or with elements outside the pre-defined model styles. A description of each element available is stored in the element library 64. When the user changes the element style of an individual element, the system 20 retrieves the element from the element library 64.

Figure 4A:
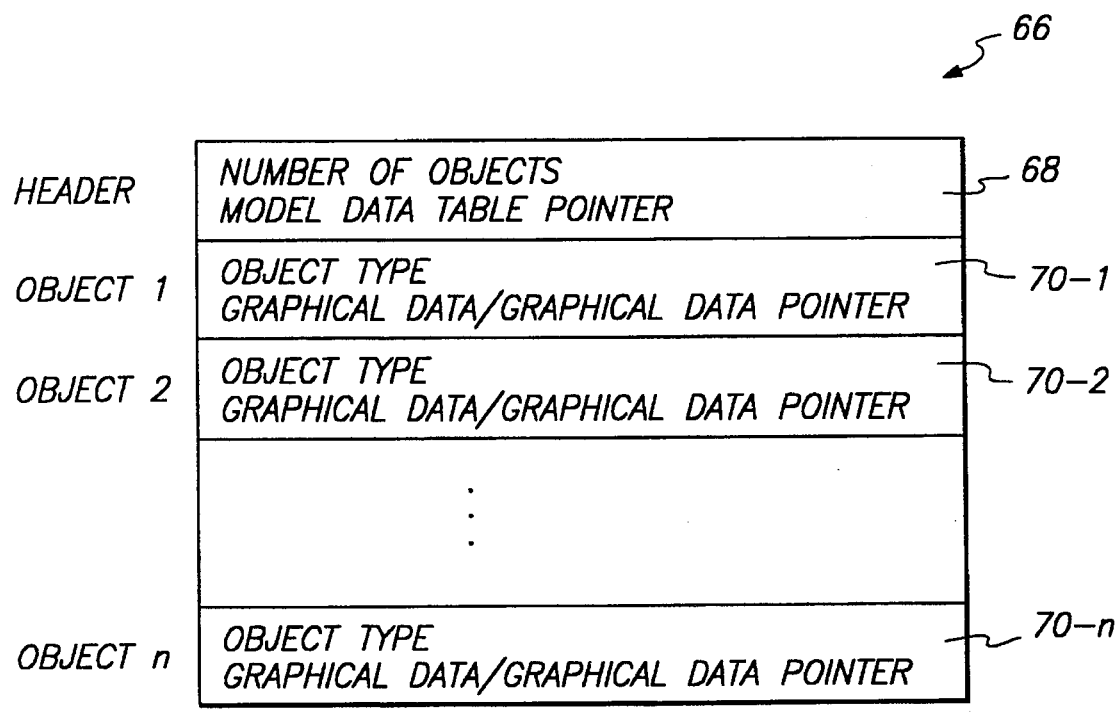
FIGS. 4A and 4B are block diagrams of a top graphics table and a group graphics table, respectively, of the present invention.

Referring now to FIG. 4A, a block diagram of a top graphics table 66 is shown. The top graphics table 66 is a data structure stored in the drawing records 44. The top graphics table 66 comprises a header field 68 and one or more object fields 70-1 to 70-n. The header field 68 is a data field for storing data concerning the top graphics table 66. The header field 68 includes a field that stores the number of objects in the drawing and a field that stores a model data table pointer. The model style data table pointer indicates a chart table which contains data that describe the drawing. An object field 70 contains data for elements or for connectors. An object field 70 comprises an object type field and a graphical data field. The object type field describes the type of object such as a rectangle, circle, oval, or other shape if the object is an element. If the object is a connector, the object type field describes the type of connector such as a serial or parallel connector. The graphical data field comprises a plurality of data fields that store data necessary to display the element or connector object. The graphical data field stores data such as size of the object, position on the screen 36, line thickness, color, shading, and other data.

The graphical data field of an object field 70 may alternatively store a pointer that indicates a group graphics table, also stored in the elements record 44, which stores the graphical data necessary for displaying the object on the display device 22.

Figure 4B:
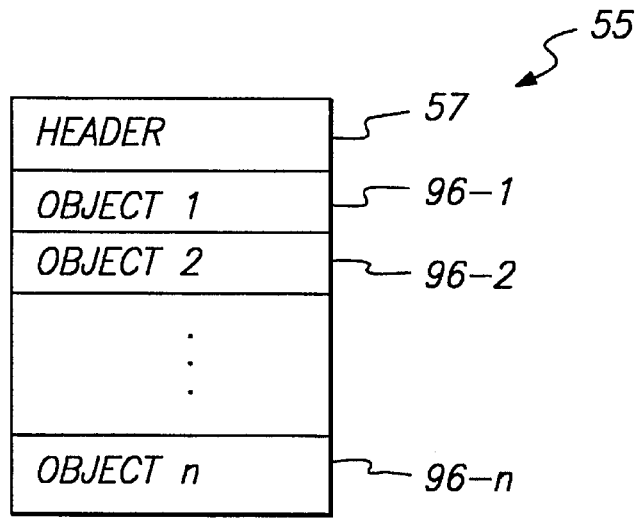

Referring now to FIG. 4B, a block diagram of a group graphics table 55 is shown. The group graphics table 40 comprises a header field 57 and one or more object fields 96-1 to 96-n. The header field 57 stores data that identify the group graphics table 55. Each object field 96 is pointed to by a graphics table pointer in the top graphics table 66. The object fields 96 store data necessary to display routines 50 to display the object of the top graphics table 66 which points to it. The object fields 96 store the same data as would be stored in an object field 70. The object fields 96 store data such as the size of the object, position on the screen 36, line thickness, color, shading, and other data. An object field 96 may alternatively contain a pointer which indicates another group graphics table 55.

Figure 5:
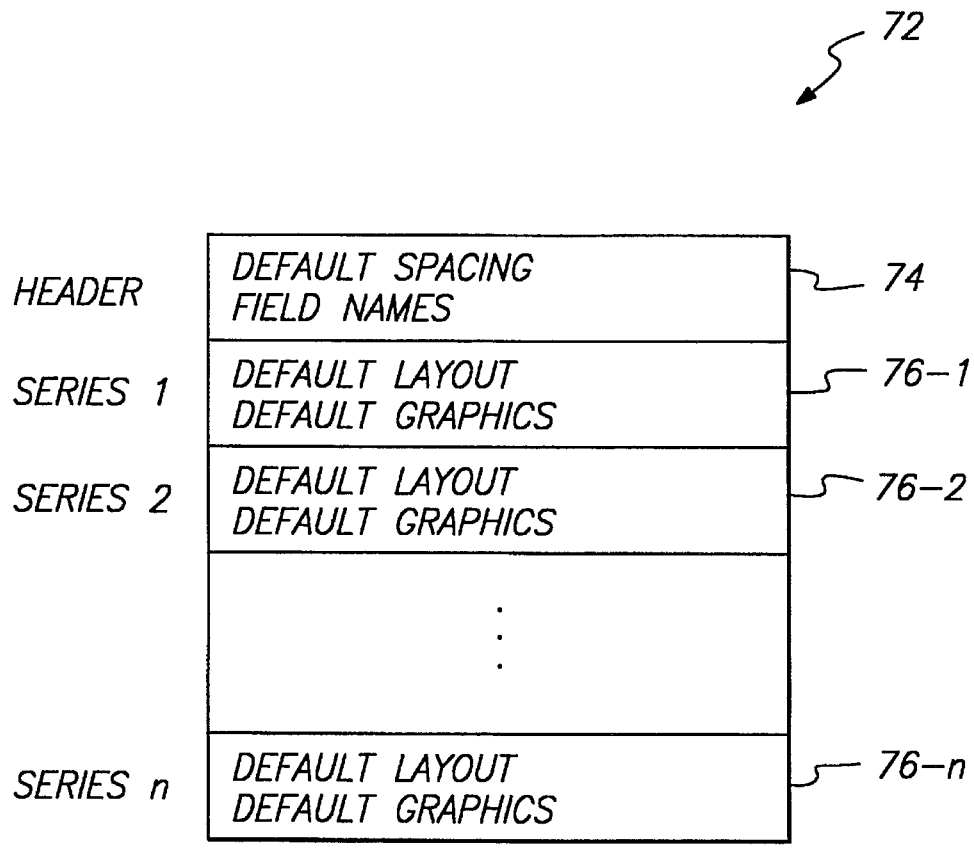
FIG. 5 is a block diagram of a first embodiment of a chart table of the present invention.

Referring now to FIG. 5, a block diagram of a first embodiment of a chart table 72 is shown. The chart table 72 is a general chart table for use with time lines, charts, and other such drawings. A chart table 72 is a data structure that is stored in the chart table memory 48. The chart table 72 comprises a header field 74 and one or more series fields 76-1 to 76-n. The header field 74 includes a field for the default spacing between the series described by the series fields 76-1 to 76-n. The header field 74 also includes a field for storing series names, and a field for storing the default connector style. A series field 76 stores default information about a series of the drawing. A series of a drawing is a set of data which is logically grouped together. A series may be a group of bars of a bar graph showing a variable at different times. For an exemplary series, see FIG. 9. Alternatively, a series may store data for a week or a month of a calendar. A series field 76 includes a field for default layout data and a field for default graphics data. The default layout data describes the default positioning of the series within the drawing. The default graphics contain graphical information needed to display the series on the display device 22. The default graphics include size of the series elements, color of the series elements, shading of the series elements, line thickness, and other such data.

Figure 6:
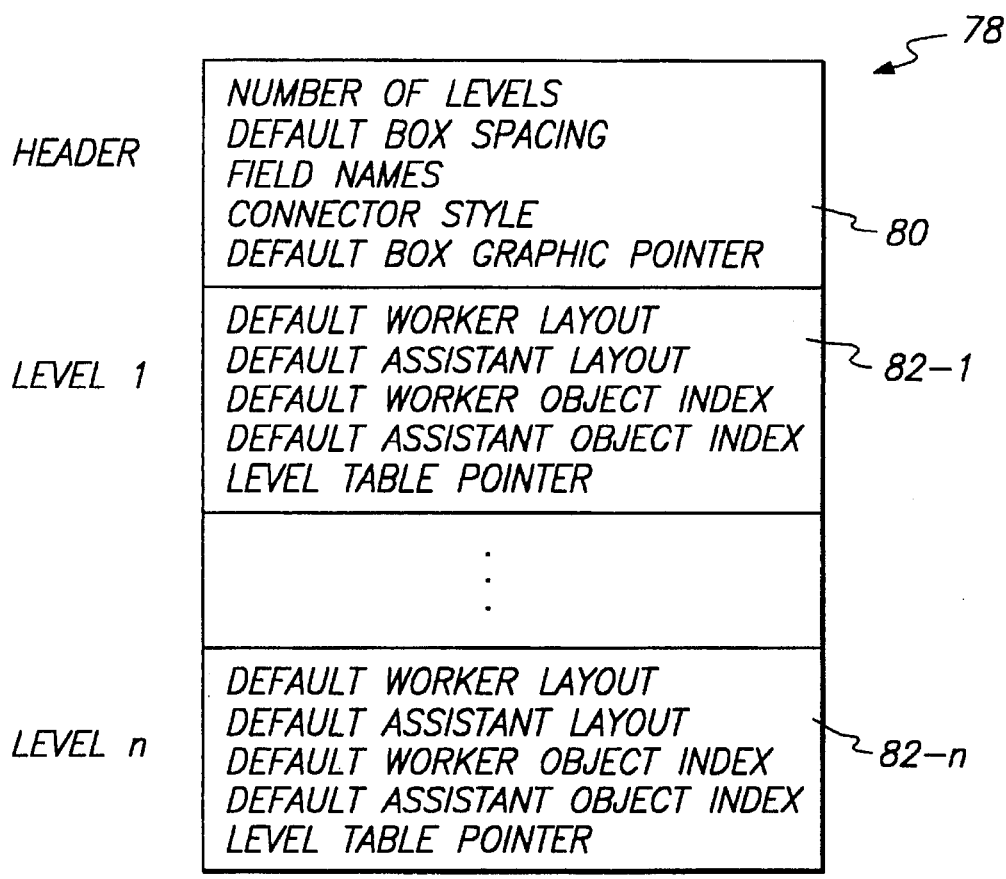
FIG. 6 is a block diagram of a second embodiment of a chart table for use with organization charts and calendars.

Referring now to FIG. 6, a block diagram of a second embodiment of a chart table 78 for use with organization charts is shown. The chart table 78 comprises a header field 80 and one or more level fields 82-1 to 82-n. The chart table 78 for organization charts uses levels in place of series. A level is a group of elements all at the same relative position within the hierarchy of the organization chart. Each level may be superior or subordinate to other levels.

The header field 80 includes a field for storing a record of the number of levels in the organization chart. The header field 80 also has fields for storing the default box spacing, that is the spacing between elements within a level, the level names, the default connector style, and a default box graphics table pointer. The default box graphics table pointer points to a default box graphics table which stores the default data that describe the elements of the organization chart. The default box graphics table will be described below with reference to FIG. 7. A level field 82 has a field for the default worker layout, a field for the default assistant layout, a field for the default worker object index, a field for the default assistant object, and a field for a level table pointer. The default worker layout is data that describe the positioning of objects inferior to an object in the current level. The layout for the objects of the next level might specify that the first element of the next level is to be placed immediately below the element of the current level with additional objects spaced evenly to the left and to the right. The layout may alternately specify that the first element of the next level is to be placed below and slightly to the left of the element of the current level with additional elements arrayed further to the left of the first element. Those skilled in the art will realize that there are many more possible layouts.

The default assistant layout describes the default positioning on the screen 36 of assistants to objects of the current level. An assistant is an object that is inferior to an object of the current level but is not a part of the level immediately below the level of the current object. In the preferred embodiment, an assistant is a part of the level of its superior. The layout for an assistant might specify that an assistant is to be below the element of the current level but above elements of the next level. The layout might also specify that the assistant is to be to the left of the element of the current level. Those skilled in the art will realize that there are many possible layouts for assistants.

The default worker object index is a pointer to an object of the default box graphics table. The default worker object indices point to objects in the default box graphics table to which the default box graphics table pointer points. The object to which the default worker object index points holds data to describe completely an object of the current level. The object holds data that specifies the size, shape, color, shading, line thickness, and other visual characteristics of the subordinate elements. The default box graphics table will be discussed in detail below with reference to FIG. 7. The default assistant object index is a pointer that indicates an object in the default box graphics table. The object to which the default assistant object index points holds data that completely describes an assistant for an object of the current level. The object holds data that specifies the size, shape, color, shading, line thickness, and other visual characteristics of the assistant elements. Finally, the level table pointer field contains a pointer that indicates a level table. Level tables will be described in detail with reference to FIG. 8.

Figure 7:
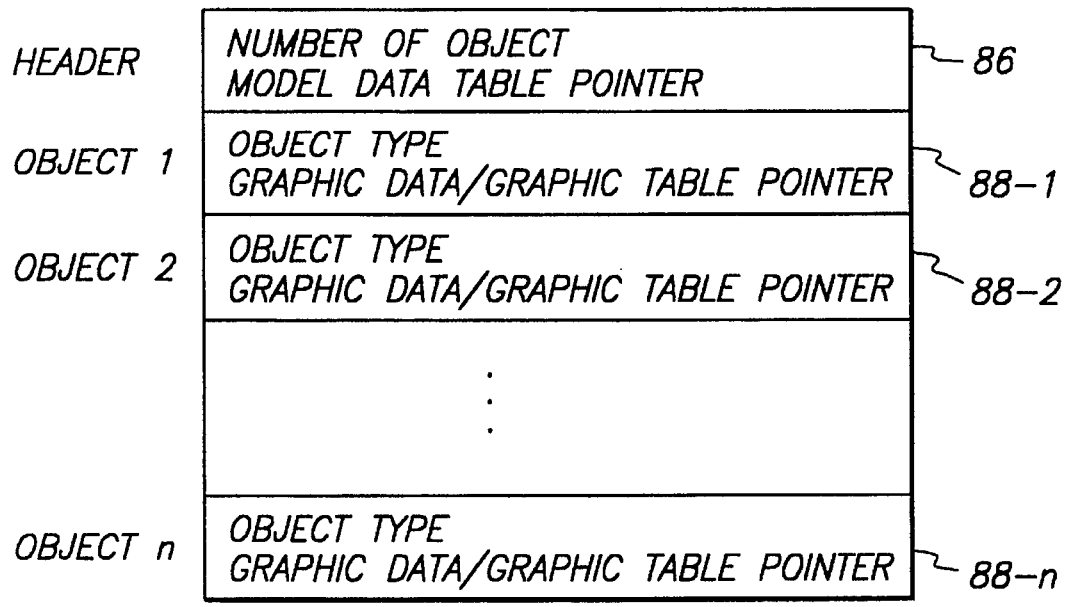
FIG. 7 is a block diagram of a default box graphics table of the present invention.

Referring now to FIG. 7, a block diagram of a default box graphics table 84 is shown. The default box graphics table 84 is a data structure comprising a header field 86 and one or more object fields 88-1 to 88-n. The default box graphics table 84 contains the default data for objects at each level of the chart table that points to the default box graphics table 84.

The header field 86 includes a field that holds a record of the number of objects in the default box graphics table 84. An object field 88 includes an object type field that records the type of object that the object field 88 describes and a graphical data field that contains the data necessary to display the object on the display device 22. Alternatively, an object field 88 may contain a graphic table pointer that indicates another default box graphic table 84 that stores the data necessary for the display routines 50 to display the object on the display device 22. A default box graphics table is substantially similar to a top graphics table 66.

Referring now to FIG. 8, a block diagram of a level table 90 is shown. The level table 90 is a data structure comprising a header field 92 and one or more box fields 94-1 to 94-n. The level table 90 is stored in the level table memory 54. The level table 90 contains specific data about each element, also referred to as a box, in a level of an organization chart. There preferably is a level table 90 for each level of the organization chart. A level table 90 is used with an organization chart and not with other drawings.

The header field 92 stores a record of the number of boxes in the level. Each element in the level has a box field 94 in the level table 90. A box field 94 comprises a box index field, a connector index field, an assistant field, a parent field, a child start field, a child stop field, an assistant start field, an assistant stop field, a worker layout field, an assistant layout field, a hidden data field, and a non-default flag field. The box index field stores a box index which points to an object in the top graphics table 66. The object field of the top graphics table 66 stores graphical information for the element which the box field 94 describes. The connector index field stores a connector index which also points to an object in the top graphics table. The objects of the top graphics table 66 are extractions of the data contained in the box fields and in the objects of the default box graphics table 84. An object of the top graphics table 66 may store data for an element or a connector, but not both together. Thus, each box field will include a box index and a connector index which will point to different objects in the top graphics table 66. The assistant field stores a flag that indicates whether or not the element described in the box field 94 is an assistant to another element. The parent field stores an identifier of the element that is the parent of the current element. In an organization chart, each element, except the very highest, is directly subordinate to an element of the level immediately above the current level. This immediately superior element is referred to as the parent element. Each element may have any number of elements immediately inferior to it; an element immediately inferior to the current element is referred to as a child of the current element. A box field stores a record of the range of elements that are children of the current element. The child start field stores a record of the first child of the current element. The child stop field stores a record of the last child element. All elements between the element referenced in the child start field and the element referenced in the child stop field are children of the current element. Similarly, the box field 94 stores records of assistants to the current element. The assistant start field stores a record of the first assistant to the current element, and the assistant stop field stores a record of the last assistant to the current element. All elements between the element referenced in the assistant start field and the element referenced in the assistant stop field are assistants to the current element. The worker layout field stores data that instructs the display routines 50 on how to layout the elements that are inferior to the current element. Workers include all children of the current element and all elements that are in turn further progeny of the children. Similarly, the assistant layout field stores data that instructs the display routines 50 on how to layout the assistants to the current element. The hidden data field stores text that is not currently displayed in the element. Text is stored in the graphic data field of the object field 70 of the top graphics table 66. The data field that stores the text comprises sub-fields according to the current model style for the element described by the data field. Each element may have text that the display routines 50 display within the element. Elements in some model styles might not have all the sub-fields of the corresponding element in another model style. The elements 124 and 130 of FIG. 11 do not contain all the text contained in the corresponding elements 124 and 130 of FIG. 10. When the model routines 46 change the model style, the model routines 46 determine if all the sub-fields within an element have corresponding sub-fields within the corresponding element of the new model style. If they do not, the model routines 46 store the unused sub-fields in the hidden data field. In this way, if the model routines 46 later change the model style back to a model style which can hold all the text, the excess text is available and is not lost. Finally, the non-default flag field stores a flag that indicates whether or not the element is a default element. If any characteristic or aspect of the element does not match the default, then the flag stored in the non-default flag field is set to indicate that the element is not a default element.

When the charting and diagramming tools 42 add a level to the organization chart, or delete a level from the organization chart, they add or delete a corresponding level 82 to, or from, the chart table 78. The charting and diagramming tools 42 also create or delete, as appropriate, the level table 90 for the created or deleted level. Similarly, the charting and diagramming tools 42 create a new box field 94 in the appropriate level table 90 whenever an element is added to the organization chart.

As can be seen from FIGS. 3-8 the data that define the drawing is recorded multiple times in the memory means 30. This repetitive storing of the data allows the present invention to change the model style used to display a drawing. The chart table 78 stores the default layout data and pointers to the default graphical data for each level or series of the drawing. These pointers point to default box graphics tables 84 which store the graphical data necessary to display the default elements. Each level of the chart table 78 for an organization chart points to a level table 90. The level table 90 has a box field 94 for each element of the organization chart. Each box field 94 of a level table 90 stores specific graphical information for each element. The graphical information of the chart table 78, default box graphics tables 84, and level tables 90 is integrated into the top graphics table and group graphics tables. By advantageously using the structure of a top graphics table 66, a chart table 78, default box graphics tables 84, and level table 90, the present invention can quickly and efficiently change the model of a drawing. The model routines 46 access the selected model and re-configure the chart table 78 and default box graphics table 84. A model style, as stored in the model library 62 is similar to the chart table 78 and default box graphics table 84. Thus, the data from the model styles transfers directly to the chart table 78 and default box graphics tables 84. The model routines 46 then traverse the level tables 90. The model routines 46 re-configure the box fields 94 and extract data from the level tables 90, default box graphics table 84, and chart table 78 for re-configuring the objects of the top graphics table 66 to which the box index and connector index point.

In this way, the present invention advantageously integrates the various aspects of the drawing. The chart table 72 or 78 has a series or level for each series or level of the drawing. Each element of an organization chart has a box field 94. Thus the data structures mirror the drawing and store the unique graphical data. The present invention also advantageously provides for the default graphical data with the default box graphics table 84. The present invention advantageously allows the model routines 46 to re-configure quickly the default data and, after analyzing the unique graphical data of each element, to re-configure each element.

The model routines 46 then integrate the data from the chart table 72 or 78, the default box graphics table 66, and level table 90. The model routines 46 re-configure the top graphics table 66 and any group graphics table 55 with the integrated data and thus, provide the data for the display routines 50 to display the drawing.

Figure 9:
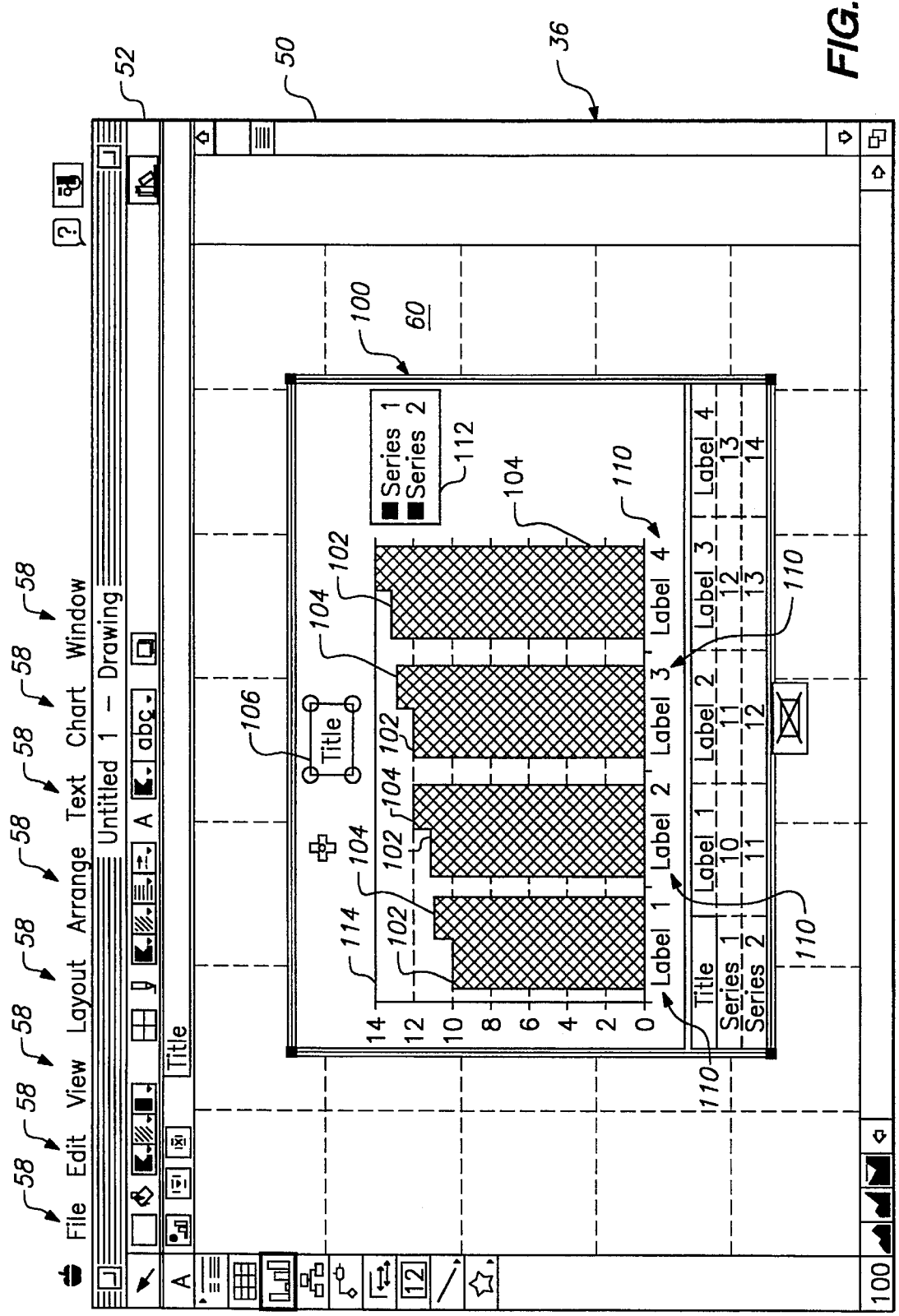
FIG. 9 is a graphical representation of the screen of the display device showing a bar chart output by the system of the present invention.

FIG. 9 graphically illustrates a screen 36 of the display device 22 showing a window 38, a plurality of pull down menus 58 and drawing portion 60 of the window 38. FIG. 9 also shows a bar chart drawing 100. The bar chart 100 comprises a first series 102, a second series 104, a title 106, a border 108, a plurality of labels 110, a key 112, and a background grid 114. The shape, style, fonts, colors, sizes, and other characteristics of these items make up the model style in which the display routines 46 display the bar chart 100. A bar chart itself is part of the model style. The model routines 46 can, in changing the model style, convert a bar chart to a pie chart, a line chart, or other similar type of chart.

Figure 10:
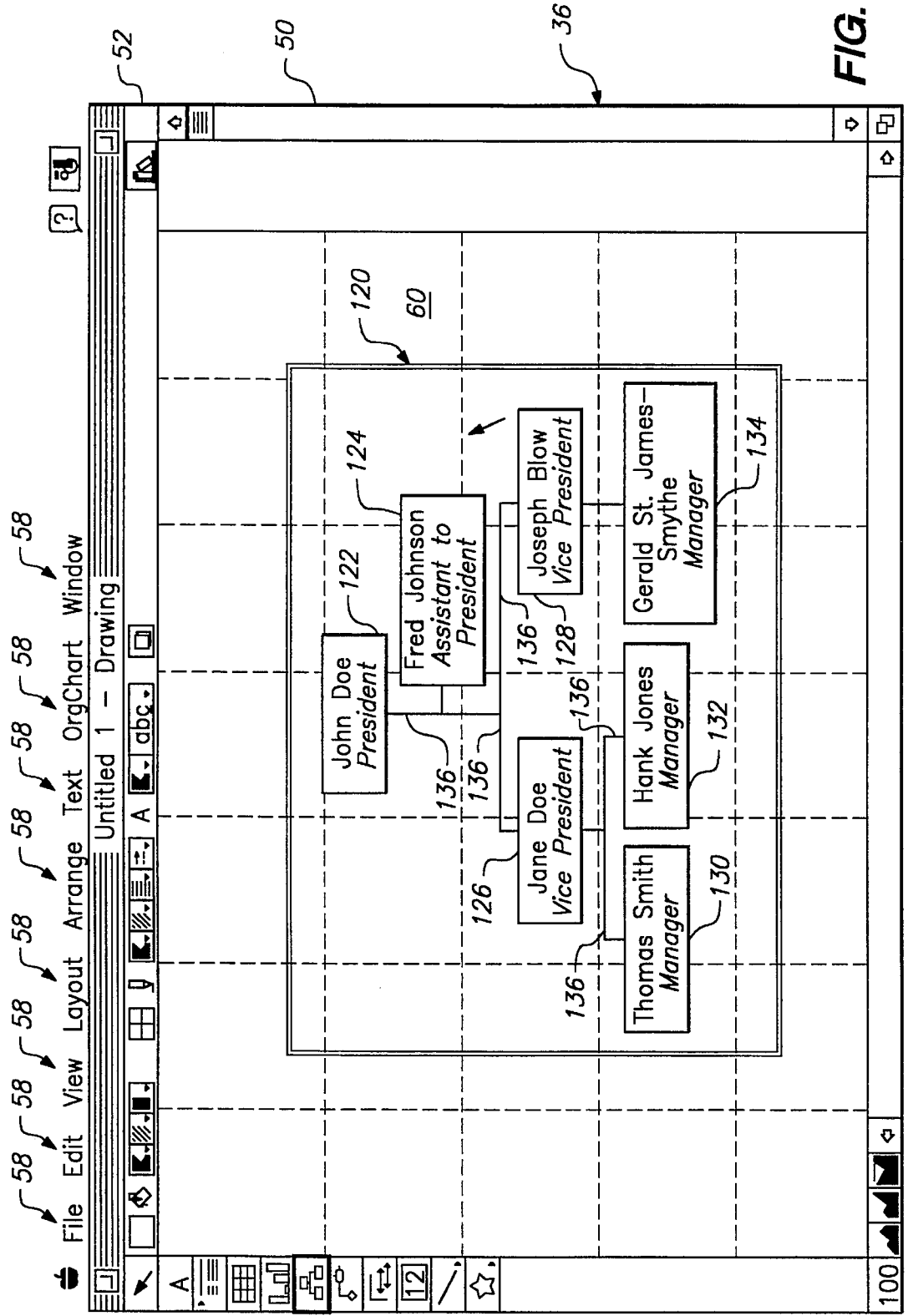
FIG. 10 is a graphical representation of the screen of the display device showing an organization chart in a first model style output by the system of the present invention.

FIG. 10 shows a graphical representation of the screen 36 of the display device 22. The screen 36 is presenting an organization chart 120. The organization chart 120 comprises a first element 122 of level 1, an assistant 124 to the first element 122 of level 1, a second element 126 of level 2, a third element 128 of level 2, a fourth element 130 of level 3, a fifth element 132 of level 3, and a sixth element 134 of level 3. The organization chart 120 also comprises a plurality of connectors 136. The assistant 124 is considered a part of level 1. The second element 126, the third element 128, the fourth element 130, the fifth element 132, and the sixth element 134 are all workers of the element 122 of level 1. That is, they are all subordinate to the first element 122 of level 1. The second element 126 and the third element 128 are children of the first element 122 of level 1. That is, they are immediately subordinate to the first element 122 of level 1.

Figure 11:
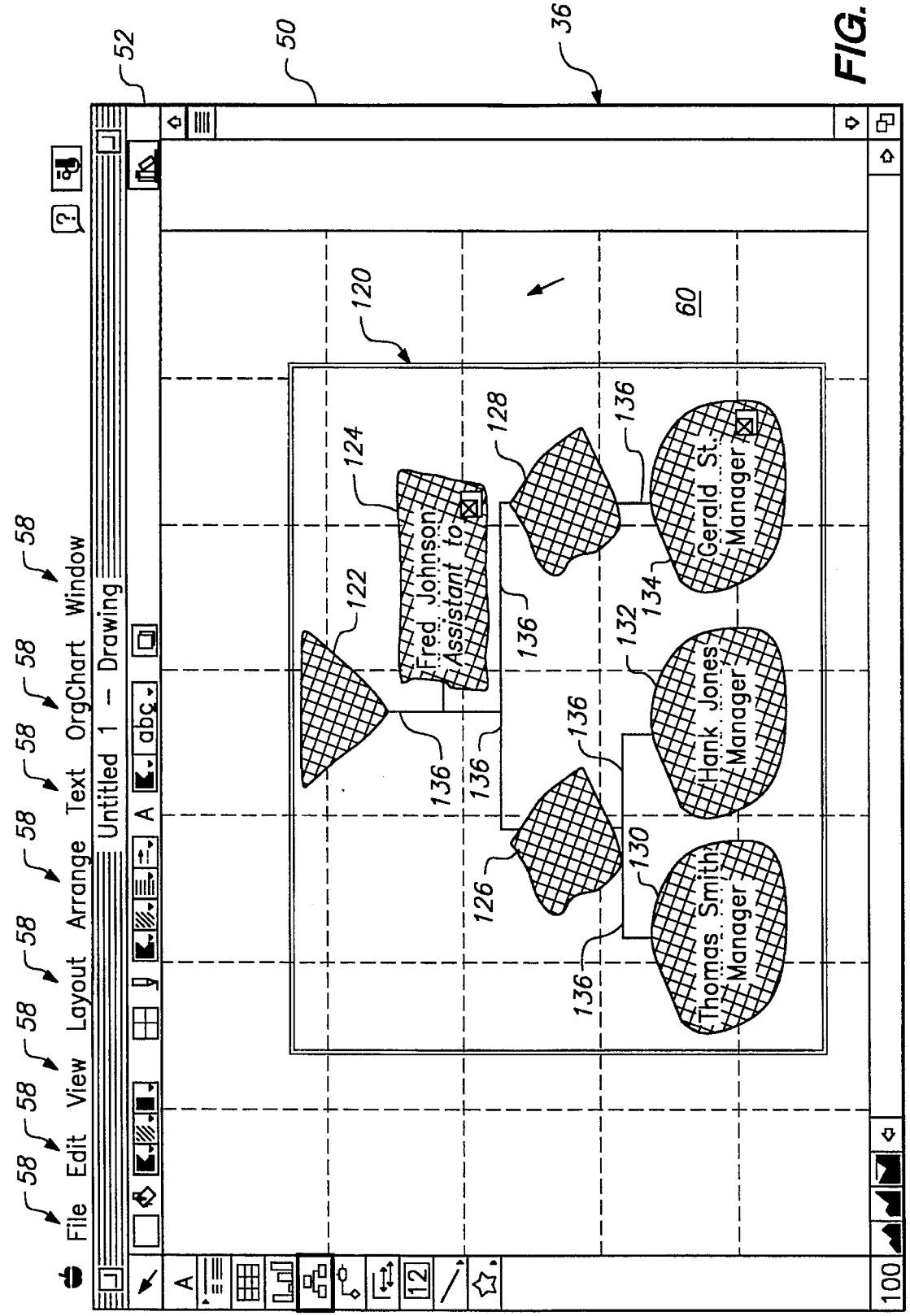
FIG. 11 is a graphical representation of the screen of the display device showing an organization chart in a second model style output by the system of the present invention.

FIG. 11 shows the organization chart 120 of FIG. 10 after execution of the model routines 46 to change the model style of the organization chart 120. As can be seen, the organization chart 120 is identical, except for the model style, to the organization chart 120 of FIG. 10. The elements of the organization chart 120 have changed in their shape and size. The connectors 136 have also changed, and so has the layout of the workers. As the display routines 50 would display the organization chart 120 on the display device 22, the color and intensity of the display would also change. Similar to color, other characteristics, which are not visible in FIG. 10 or FIG. 11, would also change. The basic information of the organization chart, however, has not changed. The relationships among the elements is the same.

FIG. 12 shows the organization chart 120 of FIG. 10 on a screen 36 of the display device 22. FIG. 12 also shows a preferred embodiment for a dialogue box 140. The dialogue box 140 is a part of a graphical user interface of the model routines 46. Through the dialogue box 140, the system 20 communicates with the user and presents possible choices of model styles. The dialogue box 140 comprises an apply button 142, a done button 144, a cancel button 146, a demonstration window 148, a plurality of fields 150, and a filter enable button 154 for displaying the names of available model styles. Also shown is a cursor 152. The operating system 40 generates the cursor 152. The user inputs commands by positioning the cursor 152 on buttons or title fields by means of the mouse of the input device 24. The user then clicks the mouse switch to indicate selection of the button or title.

While the method by which the model routines 46 change the model style will be discussed below with reference to FIGS. 14–18, here the preferred method by which a user selects a new model style and has the system 20 use the model style will now be discussed. The user selects a model style by selecting the title field 150 that displays the name of the model style. The model routines 46 and display routines 50 then display a sample drawing of the type selected, here an organization chart, in the display window 148. If the user now selects the apply button 142, the model routines 46 will change the model style of the organization chart 120. The user may observe the modified organization chart 120 in the regions of the screen 36 that are not covered by the dialogue box 140. The user may now select the done button 144 to close the dialogue box 140 and end the modification. The user may alternatively select another model style and re-select the apply button 142. If the user at any time selects the cancel button 146 the model routines 46 immediately restore the organization chart 120 to its original model style and close the dialogue box 140.

Figure 13:
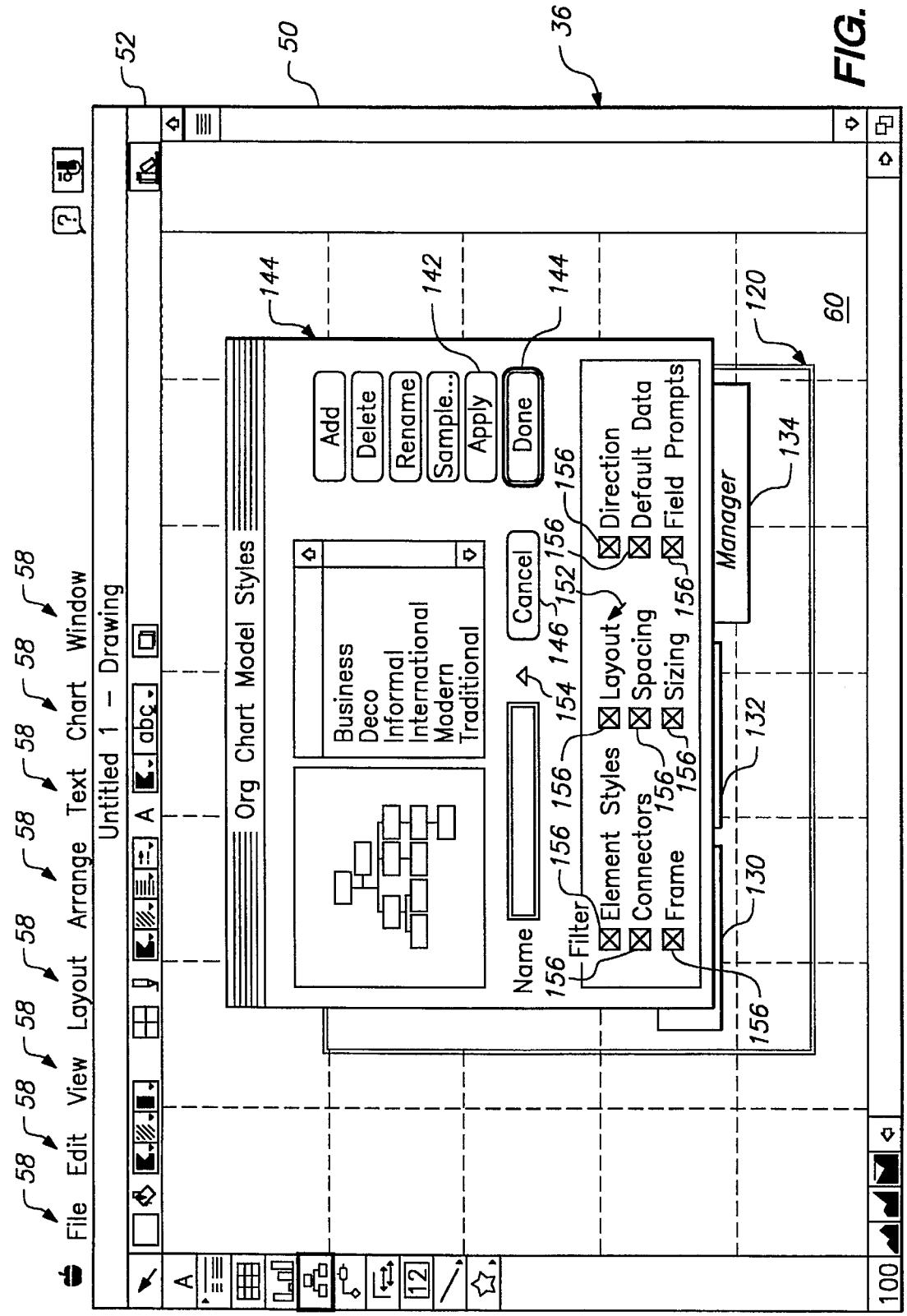
FIG. 13 is a graphical representation of the screen of the display device showing the interface of FIG. 12 with an interface for activating filters.

FIG. 13 shows a second embodiment of the dialogue box 140 of FIG. 12 with a plurality of filter buttons 156. The model routines 46 open the filter enable buttons 156 when the user selects the filter enable button 154. As described above with reference to FIG. 2, the filters 56 alter the functioning of the model routines 46. The filters 56 will limit the application of a model style. Thus, the filters 56 will prevent the model routines 46 from changing the selected characteristics. The selected characteristics of the previous model style will remain after the model routines 46 replace the previous model style. For example, if the user selects the connectors filter by selecting the filter field 156 that stores the label "connectors," when the model routines 46 replace the previous model style with the selected model style, the model routines 46 will leave the connectors in the style of the previous model style.

Figure 14:
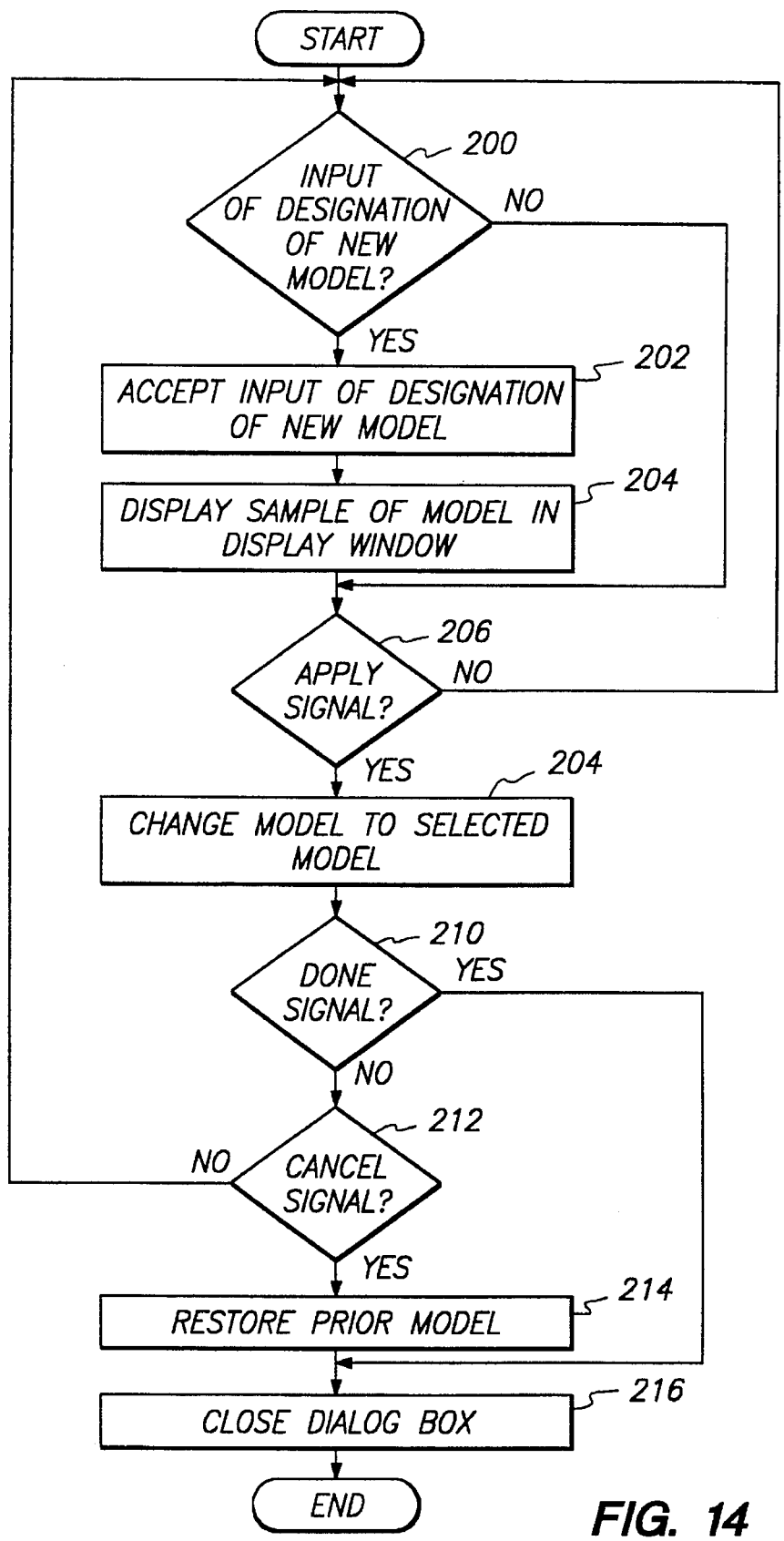
FIG. 14 is a flowchart of the preferred method for changing the model style of a drawing.

Referring now to FIG. 14, a flowchart of the preferred method for changing the model style used to display a drawing is shown. Beginning in step 200, the system 20 determines if the user has designated a new model style. If the user has designated a new model style, the model routines 46 accept the input of a model style in step 202. The user signals the new model style through the dialogue box 140 using the input device 24. In step 204, the model routines 46 instruct the display routines 50 to display a sample of the selected model style in the display window 148. The model routines 46 then search, in step 206, for an apply signal. The user generates an apply signal by selecting the apply button 142 in the dialogue box 140. If the system 20 did not receive an apply signal, the method returns to step 200 to await another designation of a new model style. If in step 206 the system 20 receives an apply signal, the method proceeds to step 208. In step 206 the model routines 46 change the model style, used by the display routines 50 to display the drawing, from the current model style to the selected model style. The methods by which the model routines 46 change model styles will be described below with reference to FIGS. 15A, 15B, 16A, 16B, 16C, and 17. The model routines 46 then, in step 210, determine if a done signal has been input to the system 20. The user generates a done signal by selecting the done button 144 in the dialogue box 140 using the input device 24. If the model routines 46 do not receive a done signal, the model routines 46 determine, in step 212, if a cancel signal exists. Similar to the done signal, the user generates a cancel signal by selecting the cancel button 146 in the dialogue box 140. If a cancel signal does not exist, the method returns to step 200 to await another designation of a new model style. If a cancel signal does exist, the model routines 46 restore the original model style in step 214. When the model routines 46 change a model style, they first store the data necessary to restore the prior model style in a temporary memory buffer in the memory means 30. The model routines 46 restore the prior model style by retrieving this stored data and deleting the modified data. The method then proceeds to step 216. If in step 210 the model routines 46 do not detect a done signal, the method also proceeds to step 216. In step 216, the model routines 46 close the dialogue box 140, and the method ends.

Figure 15A:
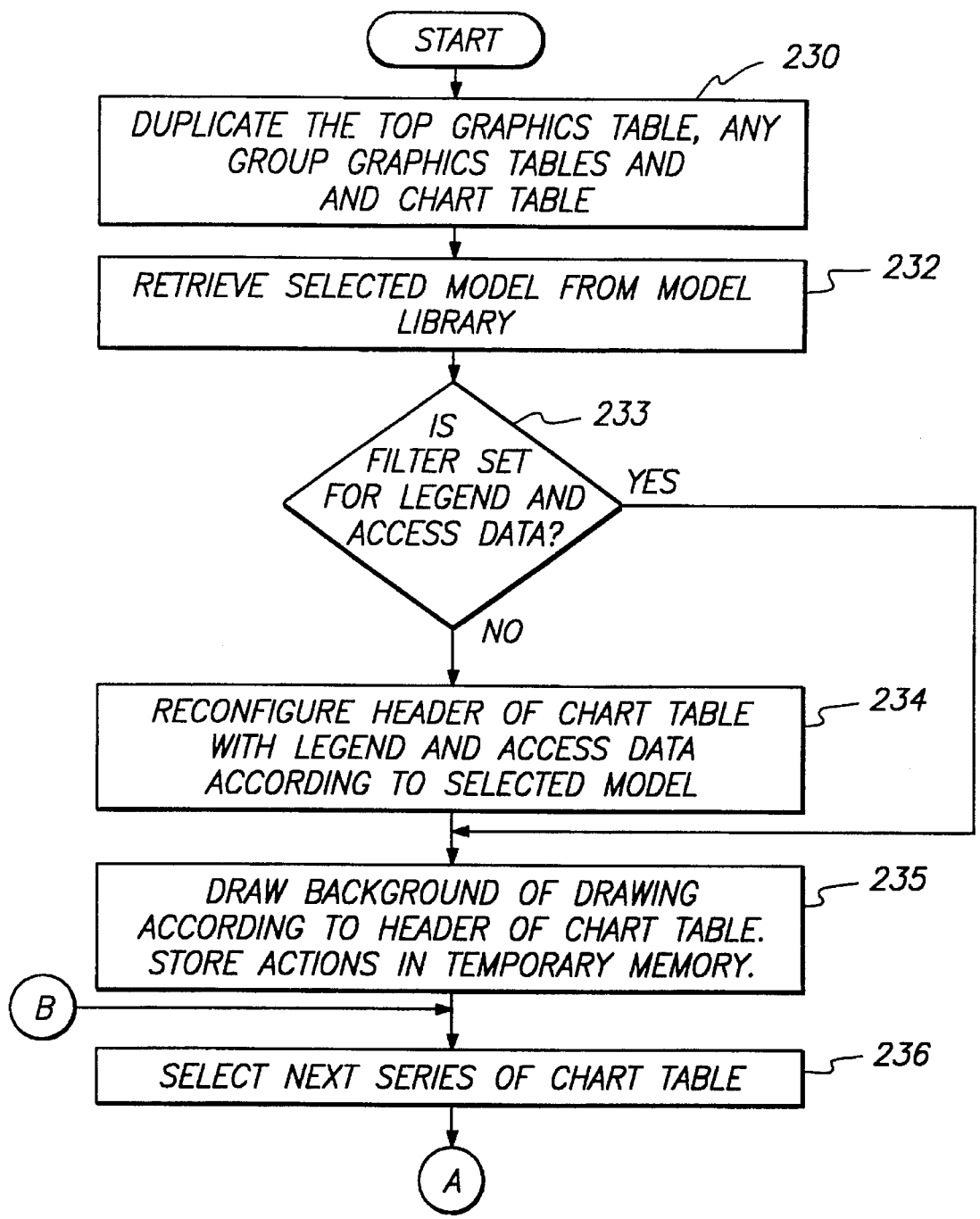
FIGS. 15A and 15B are flowcharts of the preferred method for applying a model style to a drawing.
Figure 15B:
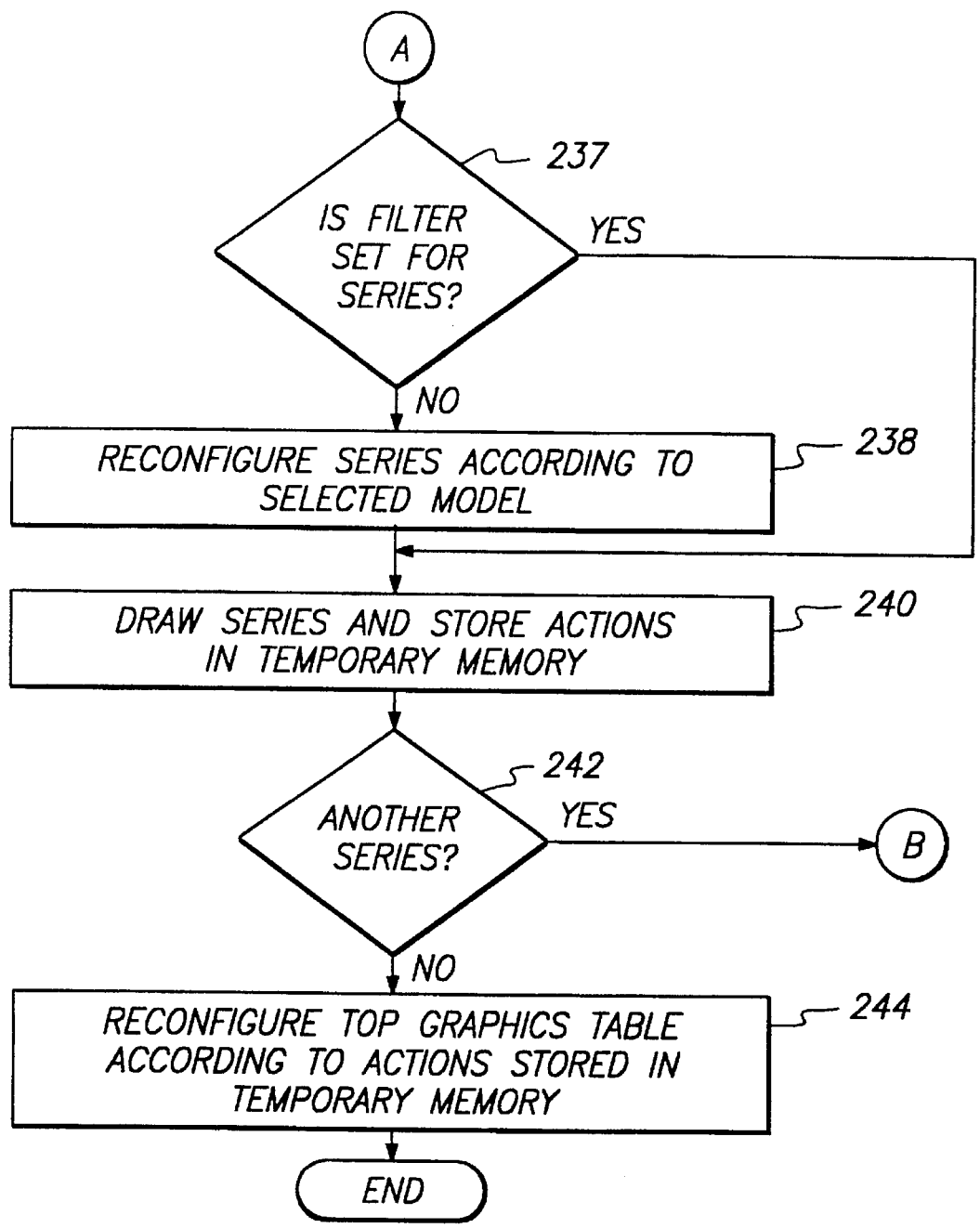

Referring now to FIGS. 15A and 15B, a flowchart of the preferred method for changing the model style for drawings, except organization charts, given a drawing and a selected model style is shown. The method begins in step 230 where the model routines 46 duplicate the top graphics table 66, any group graphics tables 55, and the chart table 72. The system 20 preferably only presents model styles in the fields 150 that are compatible with the current drawing. In an alternative embodiment, the system 20 may present model styles in the fields 150 that are incompatible with the current drawing. In this alternate embodiment, a step, before step 230, must be executed in which the model routines 46 compare the drawing to the selected model style and determine if the selected model style is compatible with the drawing. If they are not compatible, the model routines 46 retrieve the duplicate data stored in the temporary memory buffer and the method ends. If the selected model style is compatible with the drawing, the method continues in step 230. The model routines 46 temporarily store the top graphics table 66, any group graphics tables 55, and the chart table 72 in the temporary buffer memory in the memory means 30. The model routines 46 duplicate top graphics table 66, any group graphics tables 55, and the chart table 72 so that they are available for restoration should the user abandon the change in model styles. Next in step 232, the model routines 46 retrieve the selected model style from the model style library 62. In step 233, the model routines 46 determine if a filter is set for the legend and access data. If a filter is not set, the model routines 46 re-configure, in step 234, the fields that store the legend and access data by retrieving from the selected model style the legend and access data and configuring them into the appropriate fields of the header 74 of the chart table 72. In this step, the model routines 46 are applying some of the default settings of the new model style to the drawing. Those skilled in the art will realize that other default data may be included in step 234. After step 234 the method continues in step 235. If, in step 233, a filter was found to be set, the method proceeds directly to step 235 without performing step 234. In step 235, the model routines 46 hand off the header field 74 of the chart table 72 to the display routines 50. The display routines 50 draw, on the display device 22, the background of the drawing from the data in the header field 74. The background includes the axes, legends, titles, and other features. While the display routines 50 are drawing the background, they record the actions that they take to draw the drawing in a second temporary memory of the memory means 30. The model routines 46 select, in step 236, the next series field 76 of the chart table 72. In step 237, the model routines 46 determine if a filter is set for the series. If a filter is not set, the method proceeds in step 238. If a filter is set, the method proceeds in step 240. The model routines 46 re-configure, in step 238, the default layout field and the default graphics field of the series field 76 according to the default data of the current series of the selected model style.

In step 240, the model routines 46 hand off the series data to the display routines 50. The display routines 50 draw the series on the display device 22 and also store the actions that they take in drawing the series in the second temporary memory of the memory means 30. When the display routines 50 have completed drawing the series and recording their actions, the method proceeds in step 240. In step 240, the model routines 46 determine if there is another series field 76 that has not yet been displayed. If there is another series field 76, the method returns to step 236 to process the next series. If there is not another series field 76 to be displayed, the method continues in step 244. In step 244, the model routines 46 re-configure the top graphics table 66 according to the data stored in the second temporary memory. The model routines 46 store the actions of the display routines 50 so that the header field 68 and object fields 70-1–70-n contain the actions necessary to draw the drawing. The method then ends.

Figure 16A:
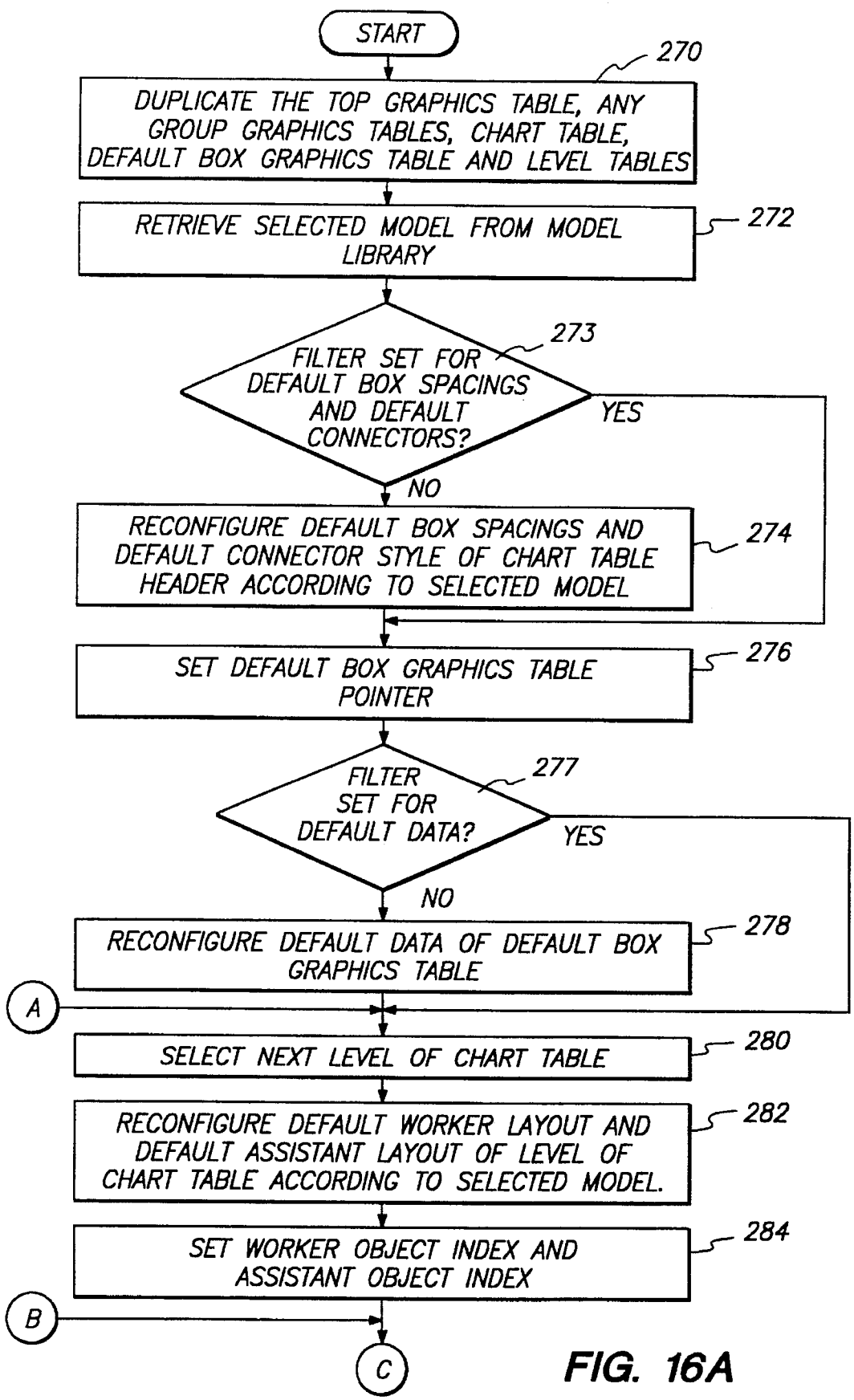
FIGS. 16A, 16B, and 16C are flowcharts of the preferred method for applying a model style to an organization chart is displayed.
Figure 16B:
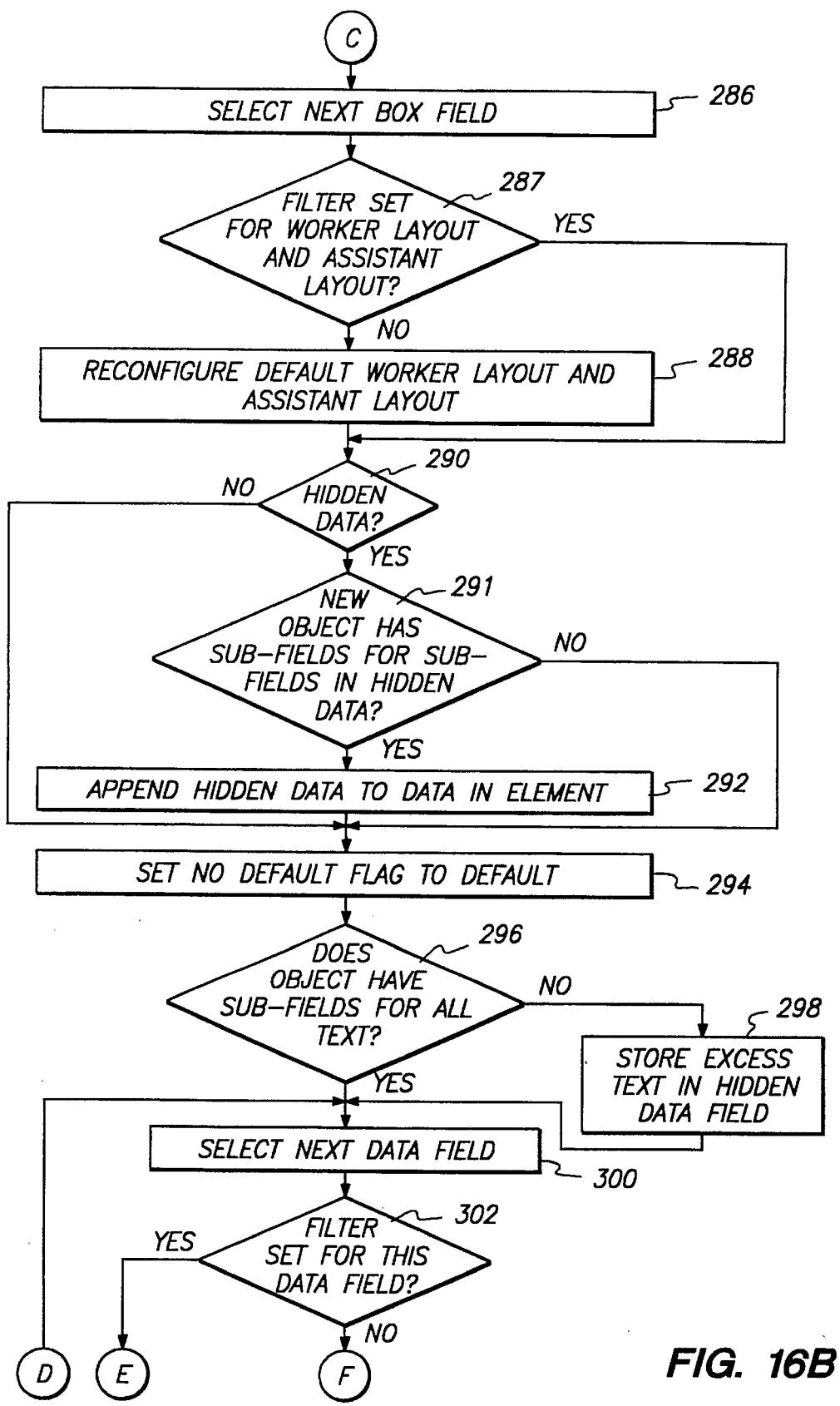
Figure 16C:
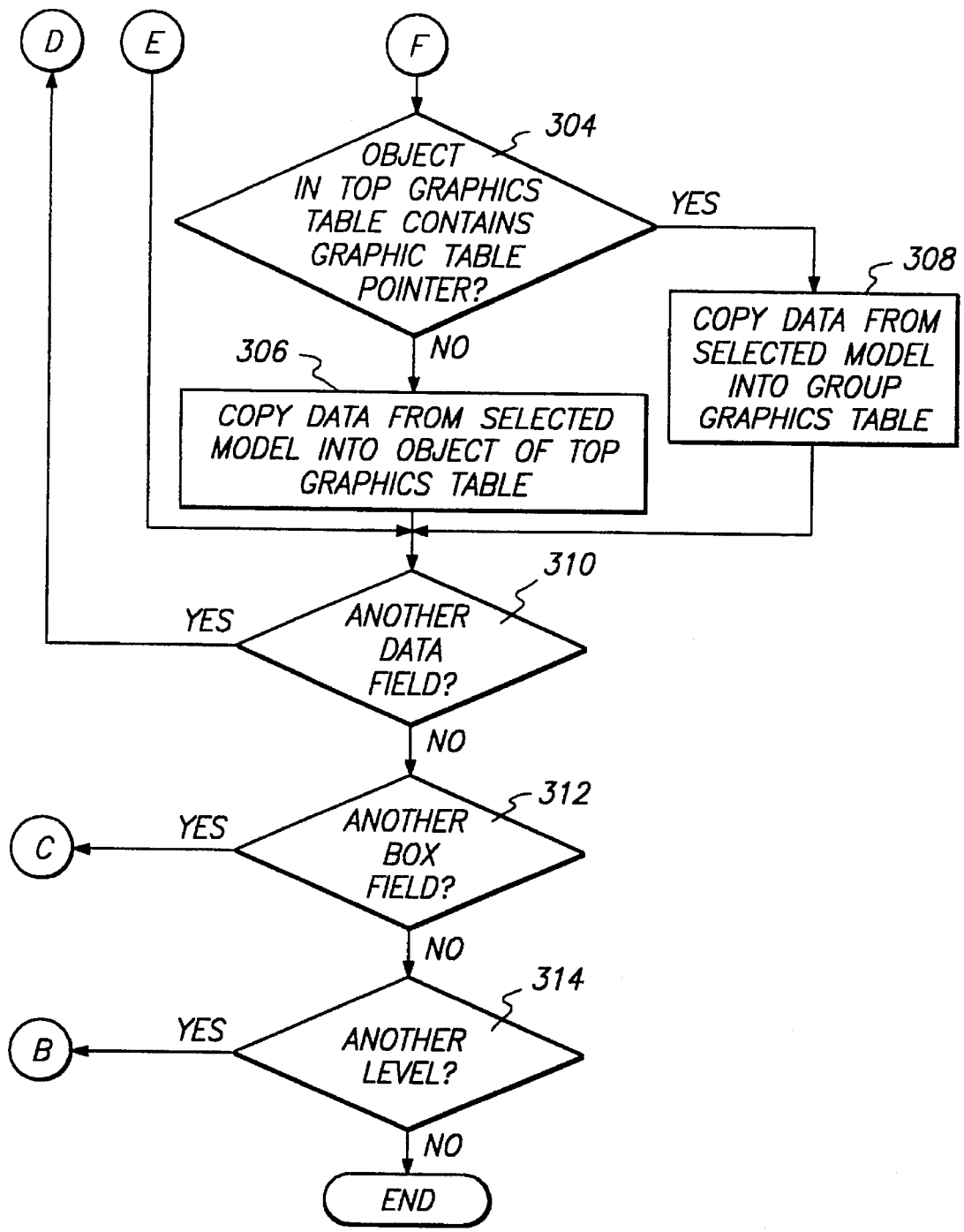

Referring now to FIGS. 16A, 16B, and 16C a flowchart of the preferred method for changing the model style of an organization chart is shown. The method begins in step 270 where the model routines 46 duplicate the top graphics table 66, any group graphics tables 55, the chart table 78, the default box graphics tables 84, and the level tables 90. The model routines 46 temporarily store the duplicated top graphics table 66, any group graphics tables 55, the chart table 78, the default box graphics tables 84, and the level tables 90 in the temporary memory buffer of the memory means 30. In step 272, the model routines 46 retrieve the selected model style from the model style library 62. In step 273, the model routines 46 determine if a filter is set for default box spacings and default connectors. If a filter is set, the method continues in step 276, otherwise the method continues in step 274. In step 274, the model routines 46 re-configure the fields for the default box spacings and default connector style of the header 80 of the chart table 78 according to the corresponding data fields of the selected model style. Next in step 276, the model routines 46 set the default box graphics table pointer. In step 277, the model routines 46 determine if a filter is set for the default data, if a filter is set the method proceeds directly to step 280. If a filter is not set, the model routines 46 re-configure the default box graphics table 84 in step 278. The model style holds the default data in substantially the same form as the default box graphics table 84. Thus, the model routines 46 re-configure the header field 80 directly from the model style.

The model routines 46 now select the next level of the chart table 78 in step 280. The levels are re-configured in order from level field 82-1 to level field 82-n. The model routines 46, in step 282, re-configure the fields that store the default worker layout and default assistant layout from the selected model style. The model routines 46 then set the worker object index and assistant object index in step 284. The worker object index and assistant object index are set to point to the appropriate objects in the default box graphics table 84. The model routines 46 have finished modifying this level of the chart table 78; the model routines 46 now modify each element of the current level.

The model routines 46 select, in step 286, the next box field 94 of the level table 90 for the current level. The box fields 94 are processed in order from box field 94-1 to box field 94-n. In step 287, the model routines 46 test if a filter is set for default worker layout and assistant layout. If a filter is not set, the model routines 46, in step 288, re-configure the fields that store the default worker layout and assistant layout of the box field 94. If, in step 287, a filter was found to be set, the method skips step 288 and proceeds to step 290. The model routines 46 then determine, in step 290, if hidden data field of the box field 94 stores hidden data. If there is hidden data, the model routines 46 determine if the new object field 70 has sub-fields for the hidden data. If the new object field 70 has sub-fields for the hidden data, the model routines 46 configure, in step 292, the sub-fields of the object field 70, indicated by the box index, of the top graphics table 66 with the hidden data. If, in step 291, the new object field 70 does not have sub-fields for the hidden data, the method proceeds directly to step 294. The model style routines set the NOT DEFAULT flag in the not default flag field to default in step 294. In step 296, the model routines 46 determine if the object field 70, indicated by the box index, does not have the sub-fields for all text. Step 296 is the compliment of step 291. If all sub-fields are not present, the model routines 46 store the sub-fields, which are not present in the selected model style, in the hidden data field in step 298, and the method continues in step 300. The method also continues in step 300 if, in step 296, the object field 70 has sub-fields for the text. In step 300, the model routines 46 select the next data field of the object field 70 of the top graphics table 66 that are indicated by the box index and the connector index of the box field 94. The model routines 46 determine, in step 302, if a filter has been set for the selected data field. If no filter has been set for the selected data field, the model routines 46 determine, in step 304, if the object fields 70 in the top graphics table 66 contain graphical data or contain pointers to group graphics tables 55. If the object fields 70 contain graphical data, the model routines 46 re-configure the data field according to the current model style for the level 82, the box field 94, and the object field 88 of the default box graphics table 84, in step 306. If the object fields 70 of the top graphics table contain pointers to group graphics tables 55, the model routines 46 re-configure the group graphics tables 54 in the same way in step 308. The method continues in step 310 from step 306, step 308, or if the model routines 46 find a filter, step 302. In step 310, the model routines 46 determine if there is another data field of the current object field 70. If there is another data field, the method returns to step 300 to process the next field. If there is not another data field, the method returns to step continues in step 312. In step 312, the model routines 46 determine if there is another box field 94 to the right of the current box field 94. If there is another box field, the method returns to step 286 to process the next box field 94. If there is not another box field 94, the method continues in step 314. In step 314, the model routines 46 determine if there is another level field 82 of the organization chart. If there is another level, the method returns to step 280 to process the next level field 82. If there is not another level, the method ends.

Figure 17:
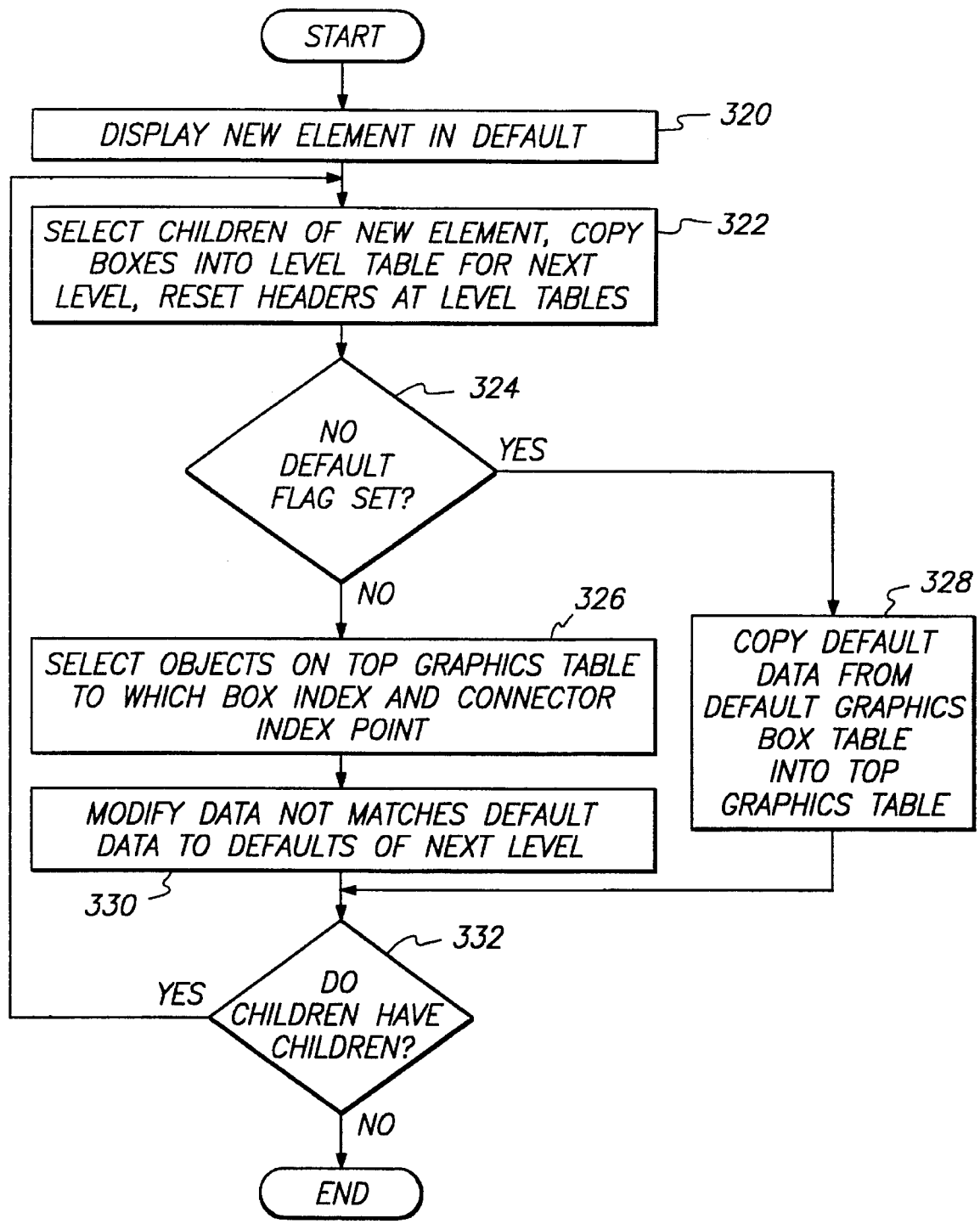
FIG. 17 is a flowchart of the preferred method for adjusting the display of an organization chart in response to an insertion of an element.

Referring now to FIG. 17, a flowchart of the preferred method for applying a model style to a newly inserted element of an organization chart is shown. In general, each level of an organization chart is displayed in a visually distinct manner. When an element is inserted into the organization chart, all elements that are workers of the inserted element must have their characteristics modified to reflect their new level. Data for the new element is placed in the top graphics table 66, chart table 78, default box graphics table 84, and level table 90 by the charting and diagramming tools 42. Thus, all data necessary for the display routines 50 to display the new element exists.

Beginning in step 320, the model routines 46 signal the display routines 50 to display the new element in the default display for the level of the new element. The model routines 46 then, in step 322, select the children of the new element. The model routines 46 copy the box fields 90 of the children into the next level down, delete the children from the level table 90 for their old level, and reset the headers 82 of the level table 90 for the level of the new element and of the level table 90 for the new level of the children. The model routines 46 select the next child in step 323. The model routines 46 determine, in step 324, if the no default flag is set in the box field of the child. If the no default flag is not set, the model routines 46 select, in step 326, the object on the top graphics table 66 to which the box index and the connector index point. The model routines 46 then re-configure these objects according to the default data for the new level of the element in step 330. If in step 324 the non default flag is set, the method proceeds to step 328. In step 328, the model routines 46 re-configures only the data that matches the default data of the model style for the level above with the default data of the model style for this level. In this way manual changes are preserved. The method proceeds to step 331 from steps 328 or 330. In step 331, the model routines 46 determine if there are more children. If there are more children, the method returns to step 322 to re-configure these children. If there are no more children, the method proceeds to step 332 where the model routines 46 determine if the children have children. If the children have children, the method returns to step 322. If the children do not have children, the model routines 46 instruct, in step 332, the display routines 50 to adjust the elements according to the layout specified for each element by that element's parent. The method then ends.

Figure 18A:
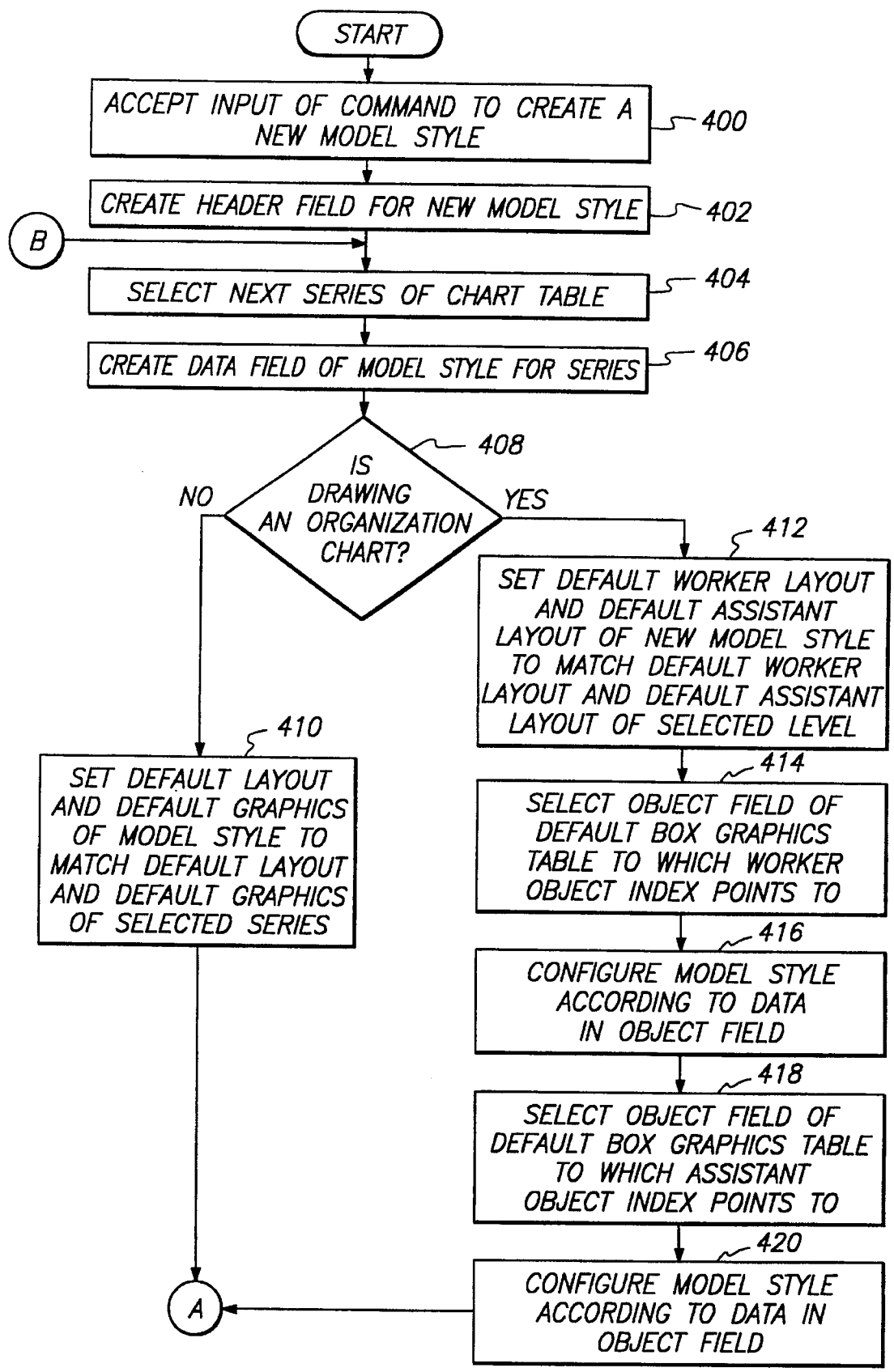
FIGS. 18A and 18B are flowcharts of the preferred method for creating a new model style utilizing the present invention.
Figure 18B:
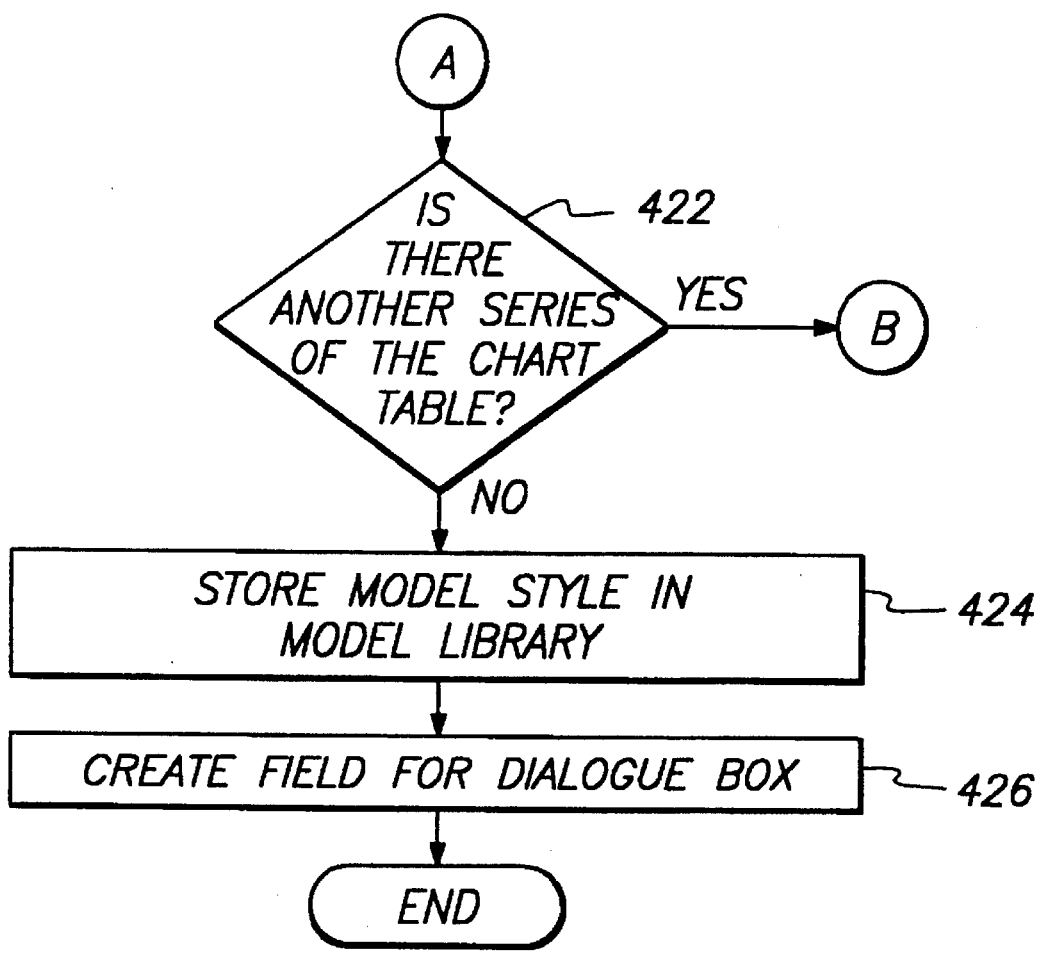

Referring now to FIGS. 18A and 18B, a flowchart of the preferred method of the present invention for creating a new model style is shown. The user may use the charting and diagramming tools 42 to modify drawings. The user may also use the elements stored in the element library 64 in a drawing. When the user modifies the same characteristic of all elements of a level or series, the charting and diagramming tools 42 modify the default box graphics table 84 and series field 82 for that level or series so that the modified characteristic becomes the default for that level or series. Thus, the drawing is in a new model style.

The method for creating a new model style begins in step 400 where the system 20 accepts an input of a command to create a new model style from the model style that is currently being used. In step 402, the model routines 46 create a header field for the new model style. The model routines 46 use the new header field to identify the new model style. In step 404, the model routines 46 select the next series field 76 or 82 of the chart table 72 or 78. When creating the new model style, the model routines 46 select the series fields 76 or 82 in order from 1 to n. The model routines 46 create, in step 406, a data field of the model style for the current series or level.

In step 408, the model routines 46 determine if the drawing is an organization chart or some other drawing. If the drawing is not a organization chart, the method proceeds to step 410. In step 410, the model routines 46 set the default layout and default graphics of the model style to match the default layout and default graphics of the selected series. The method then proceeds to step 422.

If in step 408 the model routines 46 determine that the drawing is an organization chart, the method proceeds to step 412. In step 412, the model routines 46 set the default worker layout and default assistant layout of the data field of the new model style to match the default worker layout and default assistant layout of the selected series. Then, in step 414, the model routines 46 select the object field 86 of the default box graphics table 84 to which the worker object index of the series 82 points. The model routines 46 configure, in step 416, the data field of the model style according to the data stored in the object field 86. Next, in step 418, the model routines 46 select the object field 82 to which the assistant object index points. In step 420, the model routines 46 configure the data field according to the data stored in the currently selected object field 86. The method then proceeds in step 422.

In step 422, the model routines 46 determine if there is another series or level field 76 or 82 of the chart table 72 or 78. If there is another level field 76 or 82, the method returns to step 404 to create another field of the model style. If there is not another level field 76 or 82, the model routines 46 store, in step 424, the new model style in the model style library 62 in the data stage device 26. Finally, in step 426, the model routines 46 create a new field 150 to identify the new model style in the dialogue box 120. The method then ends.

While the present invention has been described with reference to certain preferred embodiments, those skilled in the art will recognize that various modifications may be provided. For example, the present invention may apply different model styles to calendars. For calendars, the present invention would include a top calendar table, a day data table, and a month data table. The top calendar table would contain pointers to the day data table and to the month data table. The top calendar table would also include pointers to object fields of the default box graphics table. The day data table and the month data table would have pointers to objects fields of the top graphics table. These and other variations upon and modifications to the preferred embodiments are provided for by the present invention, which is limited only by the following claims.

What is claimed is:

1. A system for automatically changing at least one display characteristic of a plurality of drawing elements forming a drawing, the system comprising:

a display device having an input;

an input device having an output;

a memory having inputs and outputs for storing data, the memory including a plurality of drawing elements, routines for creating and manipulating drawing elements, a model style identifying a plurality of element groups including a first element group with a corresponding first display characteristic and a second element group with corresponding second display characteristic, and model routines for modifying the drawing using the model style by applying the first display characteristic to each of the drawing elements of the drawing which are in the first drawing element group and applying the second display characteristic to each of the drawing elements of the drawing which are in the second drawing element group; and a processing unit operating under the control of the means for modifying the display characteristics, the processing unit coupled to the display device, the input device and the memory.

2. The system of claim 1 wherein the model style comprise a chart table, the chart table having a plurality of entries, each one of the plurality of entries in the chart table identifying a set of display characteristics and a corresponding element group.

3. The system of claim 1, wherein the model style comprises a plurality of level tables, one level table corresponding to each one of the plurality of element groups, and a chart table having a plurality of entries, each one of the plurality of entries in the chart table identifying display characteristics and a corresponding level table, the level tables storing pointers to drawing elements in an element group to which the identified display characteristics are applied.

4. The system of claim 3, wherein the display characteristics include, color, line thickness, shape, size, shading and a font for text.

5. The system of claim 1, wherein the memory includes a filter for modifying the operation of the model routines, the filter specifying a subset of display characteristics, whereby the model routines modify the display characteristics of drawing elements except for the display characteristics specified in the filter.

6. In a computer system for creating and manipulating drawings formed of drawing elements each having display characteristics, a method for changing an appearance of a plurality of drawing elements forming a drawing, the method comprising the steps of:

inputting a model style, the model identifying a plurality of element groups including a first element group with a corresponding first display characteristic and a second element group with corresponding second display characteristic;

selecting the drawing;

identifying drawing elements in the first element group and drawing elements in the second element group;

changing the drawing using the model style by applying the first display characteristic to each of the drawing elements of the drawing which are in the first drawing element group and applying the second display characteristic to each of the drawing elements in the drawing which are in the second drawing element group; and displaying the changed drawing.

7. The method of claim 6, wherein the display characteristics include object type, color, line thickness, shape, size, shading and a font for text.

8. The method of claim 6, wherein the display characteristics include the shape, style, font, color, size and number of legends, series, labels and background grid.

9. The method of claim 6, wherein the display characteristics include the shape, style, font, color, size and number of elements and connectors.

10. The method of claim 6, wherein the step of identifying drawing elements comprises the steps of:

retrieving a chart table;

selecting an entry from the chart table; and retrieving the drawing elements listed in the selected entry from the chart table.

11. The method of claim 7, wherein the step of changing the drawing comprises the step of storing the set of display characteristics from the selected entry of the chart table as the display characteristics in an object that forms; the drawing element.

12. The method of claim 6, further comprising the step of inputting a filter that specifies a subset of display characteristics; and wherein the step of changing changes all of the display characteristics of the identified drawing elements except for the display characteristics identified in the subset of display characteristics.

13. The method of claim 6, wherein each of the plurality of drawing element groups for the model styles have a level and the method further comprises the steps of:

receiving an input to create a new drawing element;

creating a new drawing element having display characteristics;

determining a level for the new drawing element;

changing the display characteristics of the new drawing element to match a set of display characteristics for a drawing element group of the model style with a same level as the new element;

identifying drawing elements having a level equal to or greater than the level of the new drawing element;

increasing the levels of the identified drawing elements by one;

changing the display characteristics of the identified drawing elements to match a set of display characteristics for a drawing element group of the model style equal in level.

\* \* \* \* \*

UNITED STATES PATENT AND TRADEMARK OFFICE
CERTIFICATE OF CORRECTION

PATENT NO. : 5,596,691
DATED : January 21, 1997
INVENTOR(S) : Charles F. Good, Craig S. Young, and Antonio M. Fernandes It is certified that error appears in the above-indentified patent and that said Letters Patent is hereby corrected as shown below:

Claim 1, column 17, lines 38-39, replace "means for modifying the display characteristics" with --model routines--.

Signed and Sealed this

Eighth Day of April, 1997

*Attest:*

BRUCE LEHMAN

*Attesting Officer*     Commissioner of Patents and Trademarks